United States Patent
Koizumi

(10) Patent No.: US 10,416,806 B2
(45) Date of Patent: Sep. 17, 2019

(54) INPUT DEVICE AND CONTROL METHOD THEREFOR

(71) Applicant: Mitsubishi Electric Corporation, Tokyo (JP)

(72) Inventor: Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 197 days.

(21) Appl. No.: 15/502,549

(22) PCT Filed: Sep. 22, 2014

(86) PCT No.: PCT/JP2014/075106
§ 371 (c)(1),
(2) Date: Feb. 8, 2017

(87) PCT Pub. No.: WO2016/046888
PCT Pub. Date: Mar. 31, 2016

(65) Prior Publication Data
US 2017/0235413 A1 Aug. 17, 2017

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01); *G06F 2203/04108* (2013.01)

(58) Field of Classification Search
CPC .................... G06F 3/044; G06F 3/0416; G06F 2203/04108; G06F 3/041
See application file for complete search history.

(56) References Cited

U.S. PATENT DOCUMENTS

2011/0193818 A1* 8/2011 Chen ...................... G06F 3/041
345/174
2013/0241853 A1 9/2013 Tanaka
(Continued)

FOREIGN PATENT DOCUMENTS

JP 2008-153025 A 7/2008
JP 2011-253266 A 12/2011
(Continued)

OTHER PUBLICATIONS

International Search Report of the International Searching Authority dated Dec. 2, 2014 for the corresponding international application No. PCT/JP2014/075106 (and English translation).

*Primary Examiner* — Vinh T Lam
(74) *Attorney, Agent, or Firm* — Posz Law Group, PLC

(57) ABSTRACT

An input device includes first electrodes, second electrodes, a switch, and a control device. The first electrodes are spaced from one another in the vertical direction on the substrate. The second electrodes are spaced from one another in the lateral direction on the substrate. The switch switches at least some of the first electrodes between an electrically connected state and an electrically disconnected state. A contact location detector of the control device detects a contact location of a user in accordance with on a change of capacitance of each of the first electrodes and each of the second electrodes. A proximity detector of the control device detects approach of the user in accordance with a change of capacitance of at least some of the first electrodes.

11 Claims, 22 Drawing Sheets

(56) References Cited

U.S. PATENT DOCUMENTS

| | | | |
|---|---|---|---|
| 2013/0271396 A1* | 10/2013 | Chen | G06F 3/0416 345/173 |
| 2015/0160754 A1* | 6/2015 | Wenzel | G06F 3/044 345/174 |
| 2015/0227229 A1* | 8/2015 | Schwartz | G06F 3/044 345/174 |
| 2015/0227252 A1* | 8/2015 | Ivanov | G06F 3/0416 345/174 |
| 2015/0248177 A1* | 9/2015 | Maharyta | G06F 3/044 345/174 |
| 2016/0048213 A1* | 2/2016 | Zafiris | G06F 3/017 345/174 |

FOREIGN PATENT DOCUMENTS

| | | |
|---|---|---|
| JP | 2012-094079 A | 5/2012 |
| JP | 2012-098929 A | 5/2012 |
| JP | 2012-103995 A | 5/2012 |
| JP | 2013-191109 A | 9/2013 |
| JP | 2013-232062 A | 11/2013 |

* cited by examiner

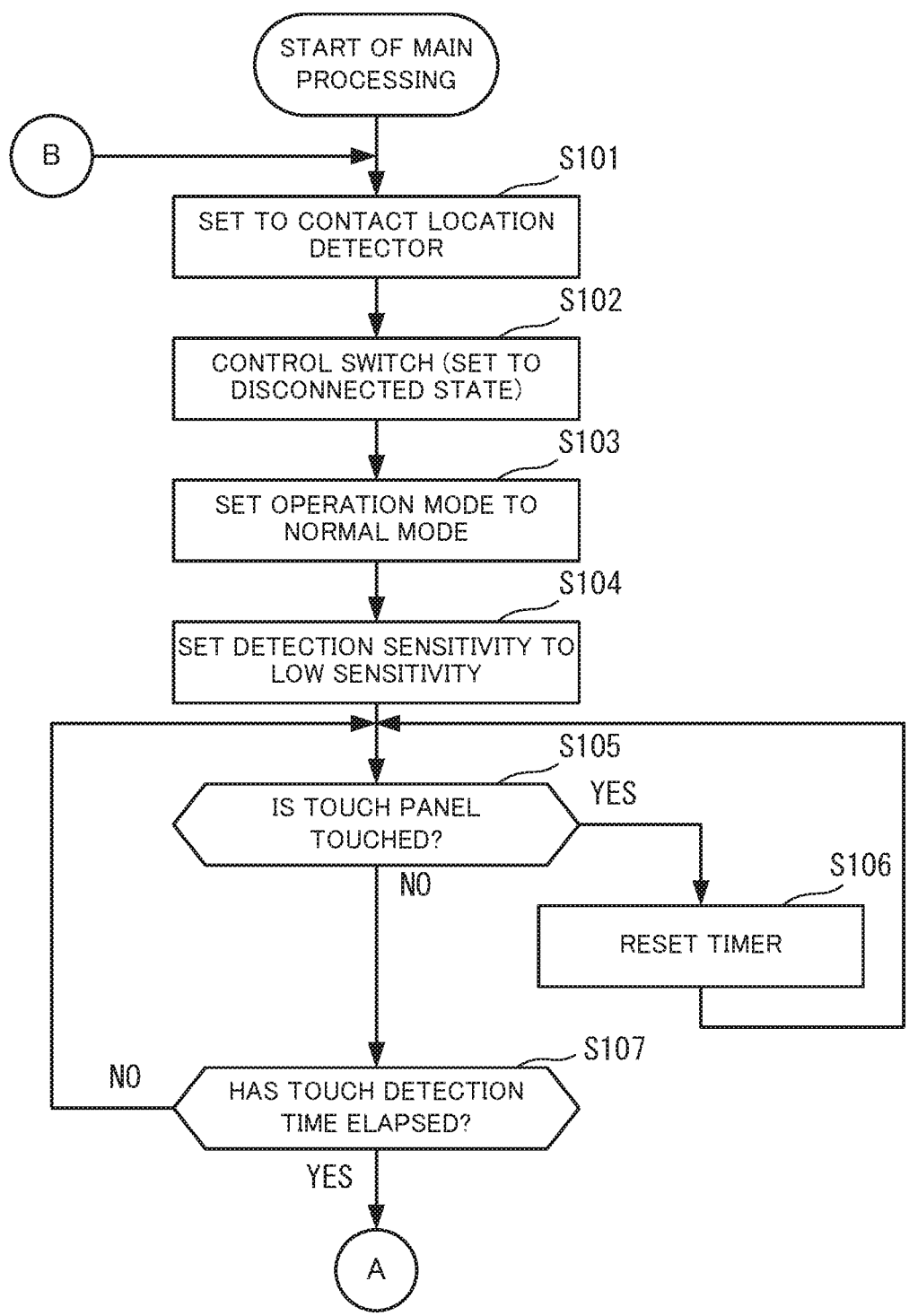

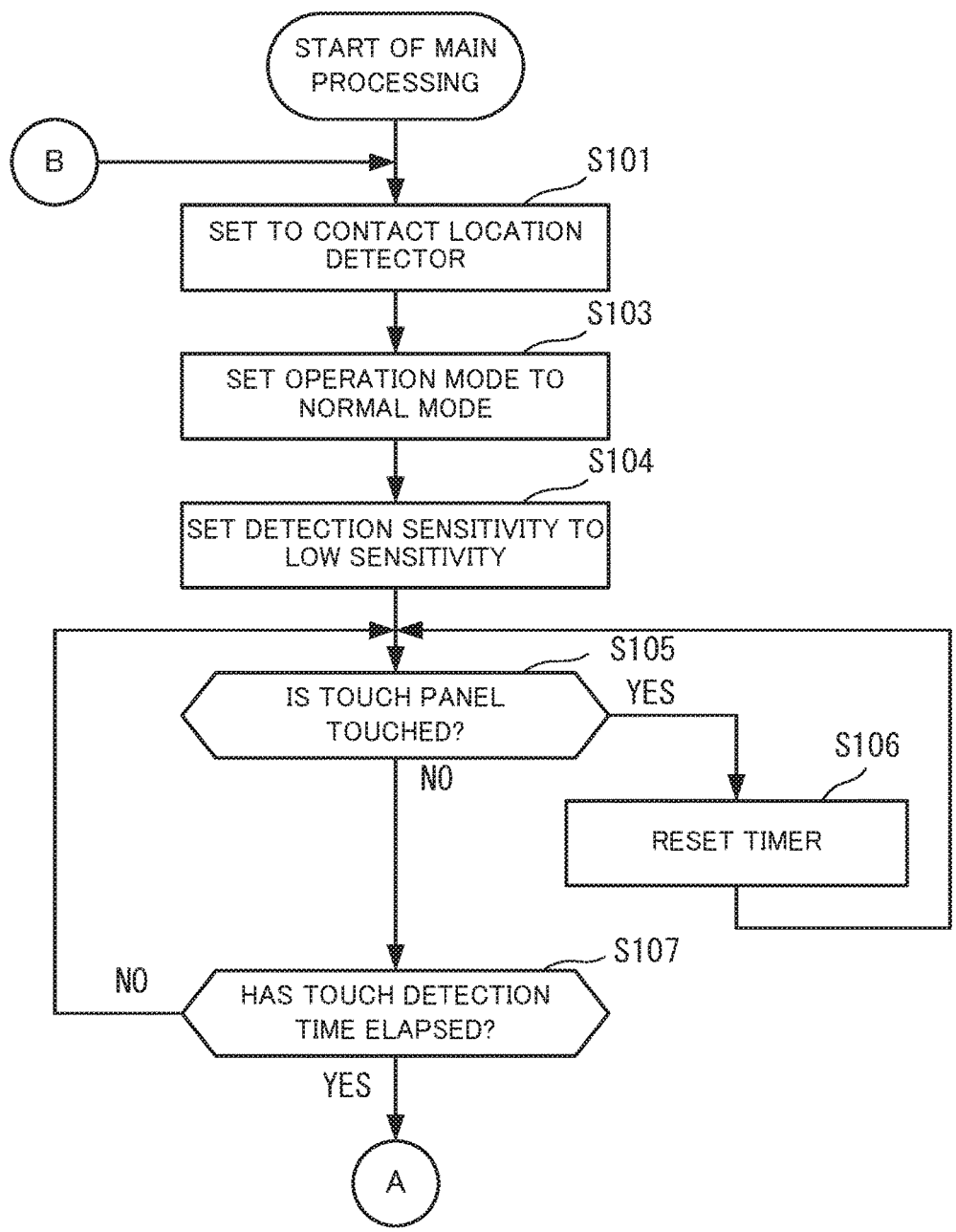

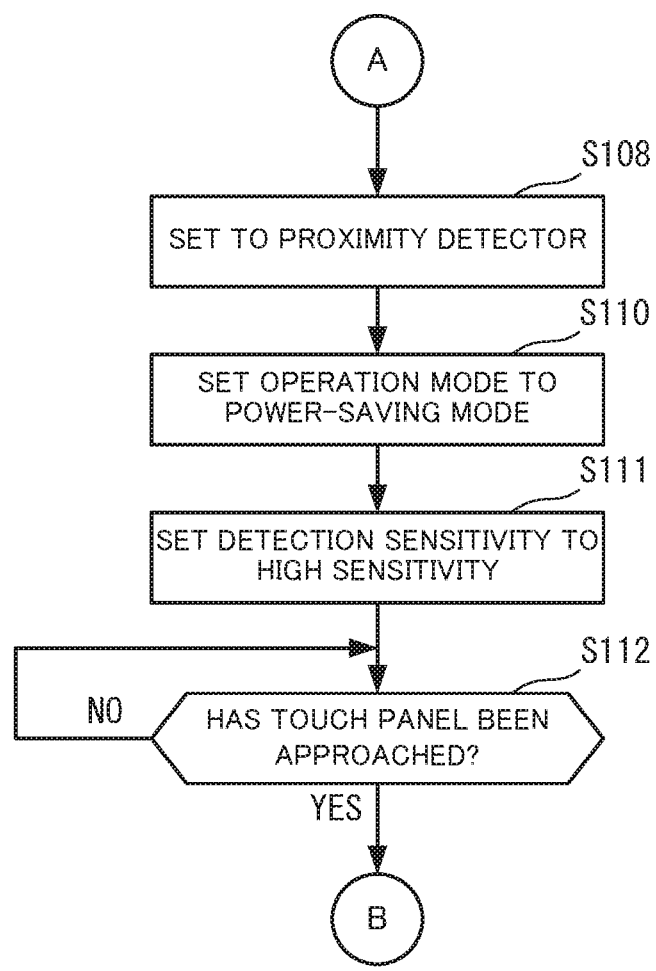

INPUT DEVICE AND CONTROL METHOD THEREFOR

CROSS REFERENCE TO RELATED APPLICATION

This application is a U.S. national stage application of International Patent Application No. PCT/JP2014/075106 filed on Sep. 22, 2014, the content of which is incorporated herein by reference.

TECHNICAL FIELD

The present disclosure relates to an input device and a control method therefor.

BACKGROUND

An ultrahigh sensitivity device is proposed for detection of touch of a finger of an operator against a capacitive touch panel, and for detection of approach of the finger of the operator toward the space in proximity of the touch panel (for example, see Patent Literature 1). Patent Literature 1 discloses that, in this ultrahigh sensitivity device, a multitude of sensors are mounted at locations aligned in the vertical and horizontal directions of the touch panel, and when a level of an output signal of the multiple sensors exceeds a reference level, the ultrahigh sensitivity device is able to determine that the finger of the operator is entering the space in the proximity of the touch panel. Further, Patent Literature 1 discloses that the space in the proximity of the touch panel is the space between the touch panel and a location separated from the touch panel by about 5 cm.

PATENT LITERATURE

Patent Literature 1: Unexamined Japanese Patent Application Kokai Publication No. 2013-232062

However, for example, when the operator enters the space separated from the touch panel by at least 5 cm, detection of entry is difficult for the ultrahigh sensitivity device described in Patent Literature 1.

SUMMARY

In order to avoid such difficulties, the objective of the present disclosure is to provide an input device that is capable of increasing the detection range in which the approach of the user can be detected.

In order to achieve the aforementioned objective, an input device for inputting by touch of a user, including: first electrodes spaced from one another in a first direction and arranged in side-by-side relation on a substrate; second electrodes spaced from one another in a second direction and arranged in side-by-side relation on the substrate, the second direction intersecting the first direction; a switch configured to switch at least two first electrodes of the first electrodes between an electrically connected state and an electrically disconnected state; a contact location detector configured to detect a contact location of the user in accordance with a change in capacitance of each of the first electrodes and each of the second electrodes in the disconnected state; and a proximity detector configured to detect approach of the user in accordance with a change in capacitance of the at least two first electrodes in the connected state.

An input device according to a second aspect of the present disclosure is an input device for inputting by touch of a user, including: first electrodes spaced from one another in a first direction and arranged in side-by-side relation on a substrate; second electrodes spaced from one another in a second direction and arranged in side-by-side relation on the substrate, the second direction intersecting the first direction; a third electrode, when viewed in a direction perpendicular to the substrate, that overlaps the first electrodes and the second electrodes, or that is separated from, and disposed at a periphery of, the first electrodes and the second electrodes; a contact location detector configured to detect a contact location of the user in accordance with a change in capacitance of each of the first electrodes and each of the second electrodes; and a proximity detector configured to detect approach of the user in accordance with a change in capacitance of the third electrode.

According to the present disclosure, the first electrodes are spaced from one another in the first direction and arranged in side-by-side relation, and the second electrodes are spaced from one another in the second direction and arranged in side-by-side relation. Thus the contact location of the user can be detected on the basis of the change of capacitance of the first electrodes and the second electrodes in the disconnected state. Further, when in the connected state, equipotential electrodes spreading out in a planar manner are formed by at least two of the first electrodes or third electrodes, and thus detecting of the approach of the user is enabled on the basis of the change of capacitance of electrodes that spread out widely in the planar manner. The electrodes for detection of the user have wide planar spread, and thus the range in which detection of the approach of the user is possible can be broadened.

BRIEF DESCRIPTION OF DRAWINGS

FIG. 6A is a flowchart illustrating main processing of Embodiment 1;

FIG. 16A is a flowchart illustrating main processing of Embodiment 3;

FIG. 16B is a flowchart illustrating main processing of Embodiment 3;

DETAILED DESCRIPTION

Embodiments of the present disclosure are described below in reference to figures. Components that are the same throughout all the figures are assigned the same reference sign.

The terms "up", "down", "right" and "left" are used in the below description as indicated by arrows in FIGS. 1, 2, 4, 7-9, 11-13 and 17. Further, in FIGS. 1, 2, 4, 7-9, 11-13 and 17, the direction out of the paper is taken to be the "front" direction, and the direction into the paper is taken to be the "rear" direction. These terms "up", "down", "right", "left", "front" and "rear" are used for description of directions and do not limit the present disclosure.

Embodiment 1

Figure 1:
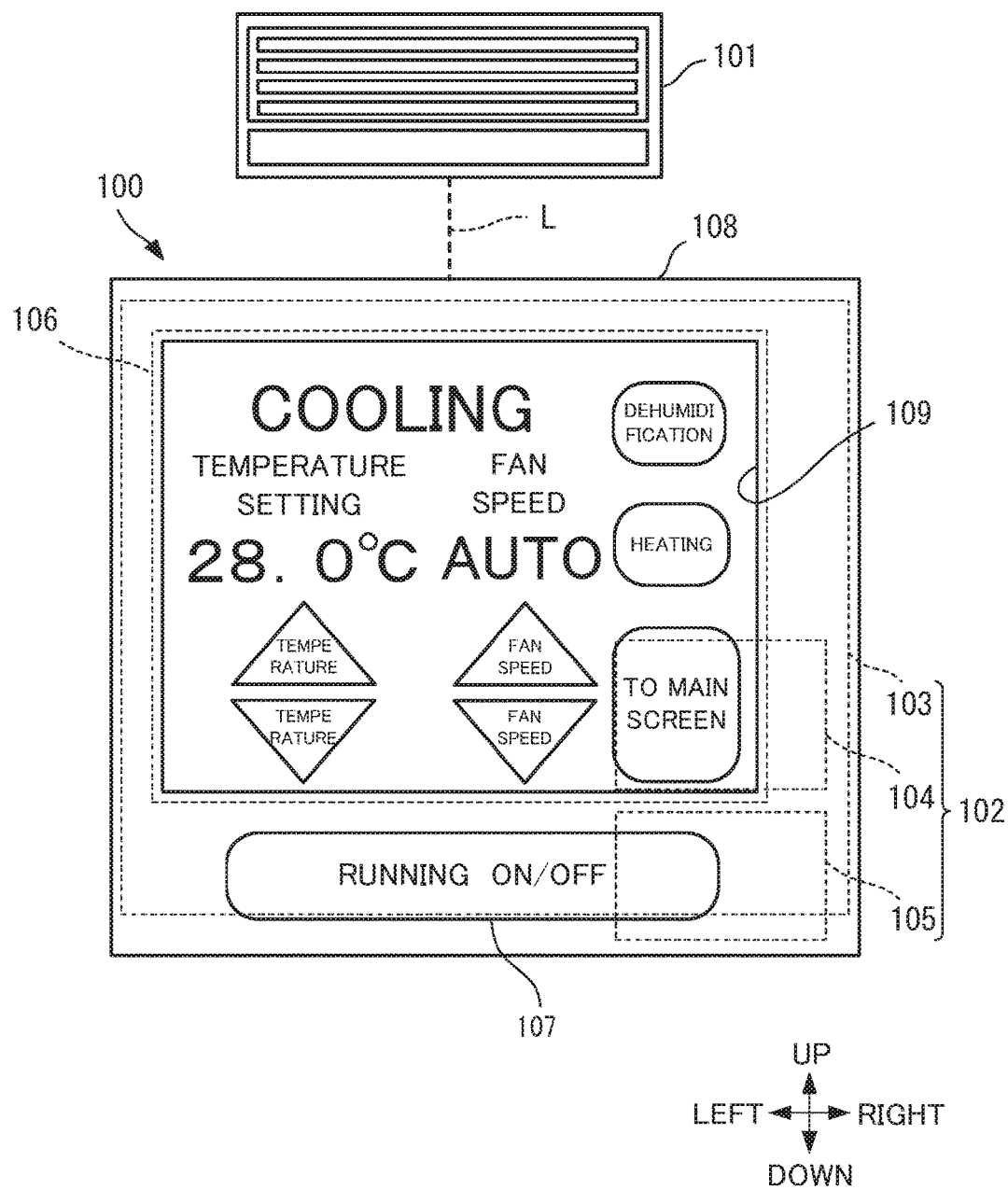
FIG. 1 is a front view of a remote controller of Embodiment 1 of the present disclosure.

A remote controller 100 of Embodiment 1 of the present disclosure is a device for remote control of an air conditioner 101, and as illustrated by front view in FIG. 1, includes: a touch panel 103 including an input device 102 for input by touch of a user, a control device 104, a power supply 105, a display 106 for display of a screen, a power supply button 107 for switching the air conditioner 101 ON and OFF, and a cover 108 for arrangement of various types of components including these components.

For example, when the user operates the input device 102 or the power supply button 107, the remote controller 100 communicates with the air conditioner 101 through a communication line L according to the operation, thereby remotely controlling the air conditioner 101. Further, the communication line L may be formed by wireless, wired lines, or a combination of wireless and wired lines.

The touch panel 103 is a sheet-like substantially transparent component, and for example, is fixed to the interior of the cover 108. As in FIG. 2 illustrating a front view of the touch panel 103, as in FIG. 3A illustrating a cross-section along line A-A in FIG. 2, and as in FIG. 3B illustrating a cross-section along line B-B in FIG. 2, the touch panel 103 is equipped with: a substrate 111 and four first electrodes 112, four first lines 113a-d, an insulating film 114, five second electrodes 115, five second lines 116a-e, a protective sheet 117, and a switch 118 arranged on the substrate.

The substrate 111 is a transparent substrate, and for example, is mainly made of a material such as glass.

The four first electrodes 112 are arranged on the substrate spaced apart from one another in the upward direction, and thus these electrodes are not mutually electrically connected to one another. Further, the expression "on the substrate" in the present embodiment means in front of the substrate 111 rather than above the substrate 111 and is not limited to meaning contacting the main surface of the substrate 111, where the term "main surface" is taken in the present embodiment to mean the front face or rear face of the substrate 111.

Figure 2:
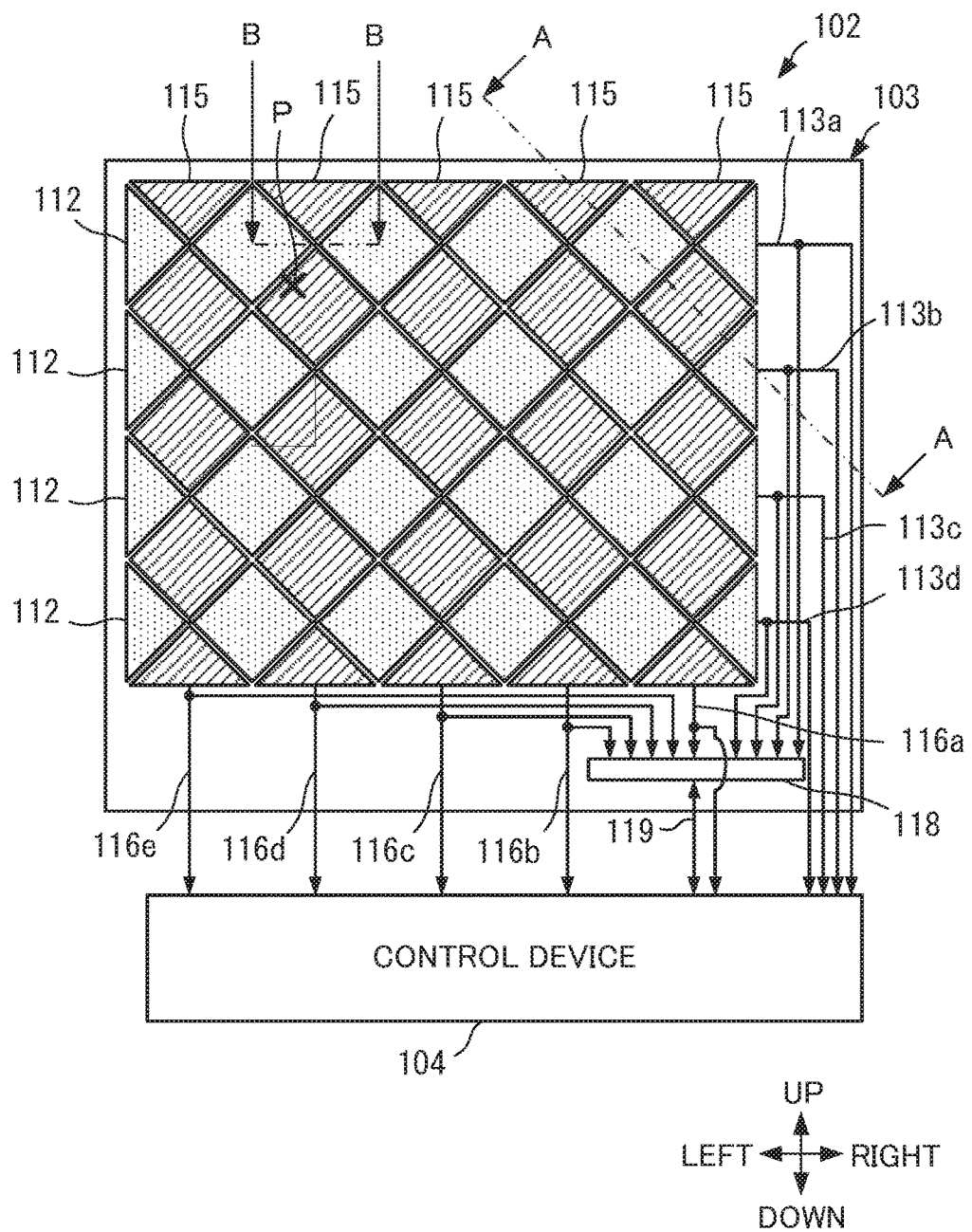
FIG. 2 is a front view of an input device of Embodiment 1 of the present disclosure.
Figure 3A:
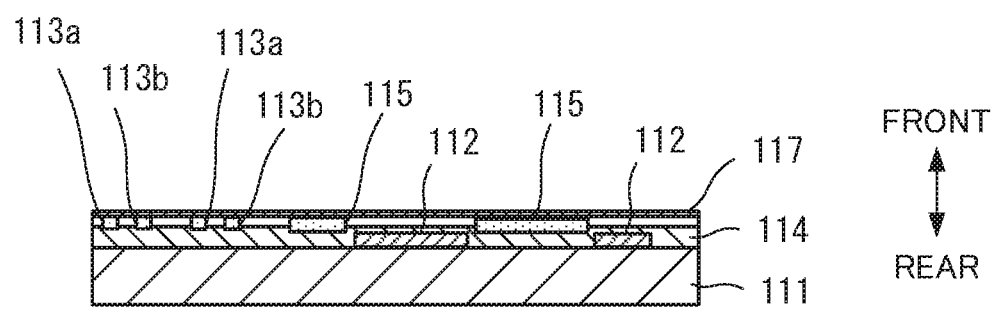
FIG. 3A is a cross-sectional view along line A-A in FIG. 2.
Figure 3B:
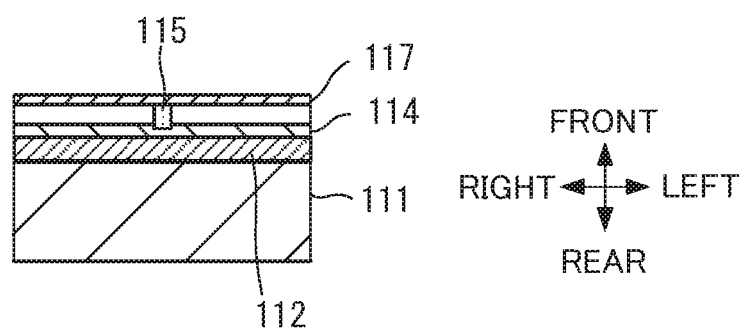
FIG. 3B is a cross-sectional view along line B-B in FIG. 2.

In particular, as illustrated in FIG. 2, each of the first electrodes 112 of the present embodiment has an electrode pattern formed by a plurality of square-shaped or right-triangle-shaped first electrode parts and first connection lines that interconnect the first electrode parts which are laterally adjacent to one another. Each of the first electrode parts is a transparent electrode, for example, mainly formed of a material such as indium tin oxide (ITO). Each of the first connection lines is a conductive line electrically connected to the first electrode parts, and for example, is a transparent line, for example, having ITO as the main material, or is a fine line of non-transparent metal.

The four first lines 113a-d are each connected to a one-to-one corresponding electrode of the four first electrodes 112. Each of the first lines 113a-d, at a point along the length of the line, branches into two branch lines. For each of the first lines 113a-d, one of the branch lines connects to the control device 104, and the other branch line connects to the switch 118. The main material forming the first lines 113a-d, for example, is ITO, metal, and the like.

As illustrated in FIG. 3A and FIG. 3B, the first electrodes 112 and the first lines 113a-d are arranged directly on the substrate in the present embodiment. Further, in cases such as when a shatter-proofing sheet, for prevention of shattering upon breakage of the substrate 111, is arranged directly on the substrate 111, the first electrodes 112 and the first lines 113a-d, rather than directly contacting the substrate 111, for example, may be arranged in the same layer on the shatter-proofing sheet.

The insulating film 114, for example, is arranged so as to cover the first substrate 111, as well as the four first electrodes 112 and four first lines 113a-d arranged on the substrate. The insulating film 114 is formed from an insulating material such as a resin.

As illustrated in FIG. 2, five second electrodes 115 are arranged laterally-separated from one another, so as to, together with the first electrodes 112, roughly cover predetermined regions on the substrate equipped with the first electrodes 112 and second electrodes 115. Here, the expression "roughly cover" means that gaps may be formed between the first electrodes 112 and the second electrodes 115. Further, as illustrated in FIG. 3A and FIG. 3B, the five second electrodes 115 are arranged on the insulating film 114. Thus the five second electrodes 115 are not mutually electrically connected to one another, and are arranged on the substrate with the insulating film 114 interposed between the five second electrodes 115.

As illustrated in FIG. 2, each of the second electrodes 115 of the present embodiment has an electrode pattern similar to that of the aforementioned first electrodes 112 rotated by 90 degrees. In particular, each of the second electrodes 115 has an electrode pattern formed by a plurality of square-shaped or right-triangle-shaped second electrode parts and second connection lines that interconnect the second electrode parts vertically adjacent to one another. Each of the second electrode parts is a transparent electrode, for example, mainly formed of a material such as ITO. Each of the second connection lines is a conductive line electrically connected to the second electrode parts, and for example, is a transparent line, for example, having ITO as the main material, or is a fine line of non-transparent metal.

The five second lines 116a-e are each connected to a one-to-one corresponding electrode of the five second electrodes 115. Each of the second lines 116a-e, in the same manner as the first lines 113*a-d*, branches into two branch lines at a point along the length of the line. For each of the second lines 116*a-e*, one of the branch lines is connected to the control device 104, and the other branch line is connected to the switch 118. The main material forming the second lines 116 *a-e*, for example, is ITO, metal, and the like, in the same manner as the first lines 113*a-d*.

Further, the electrode pattern of the first electrodes 112 and second electrodes 115 is not limited to the pattern described in the present embodiment, and various types of patterns may be used. For example, the sizes, shapes, and the like of the first electrode part, first connection line, second electrode part, and second connection line may be appropriately selected. Further, the number of first electrodes 112 and second electrodes 115 may be appropriately selected. The first lines 113*a-d* may be arranged to correspond one-to-one to the first electrodes 112, and the second lines 116*a-e* may be arranged to correspond one-to-one to the second electrodes 115. The number of first lines 113*a-d* may be selected appropriately in accordance with the number of first electrodes 112, and the number of second lines 116*a-e* may be selected appropriately in accordance with the number of second electrodes 115.

In order to protect the second electrodes 115 and the second lines 116*a-e*, the protective sheet 117, for example, is arranged to cover the substrate 111 as well as the five second electrodes 115 and five second lines 116*a-e* on the substrate. The insulating film 114 is formed from an insulating material such as a resin.

As illustrated in FIG. 2, the switch 118 is connected to each of the first lines 113*a-d*, each of the second lines 116*a-e*, and a switch-control device line 119 for transmitting and receiving signals with the control device 104. The switch 118 switches the four first electrodes 112 and the five second electrodes 115 between electrically connected and disconnected states on the basis of a switch control signal acquired from the control device 104 through the switch-control device line 119. Further, in the case of the connected state, the switch 118 outputs to the control device 104 as a proximity detection signal the signal acquired from the four first electrodes 112 and the five second electrodes 115.

Here, the term "connected state" in the present embodiment refers to a state in which the four first electrodes 112 and the five second electrodes 115 are all mutually electrically connected. Further, the term "disconnected state" refers to a state in which each of the four first electrodes are not electrically connected to one another, and the five second electrodes 115 are not electrically connected to one another.

Figure 4:
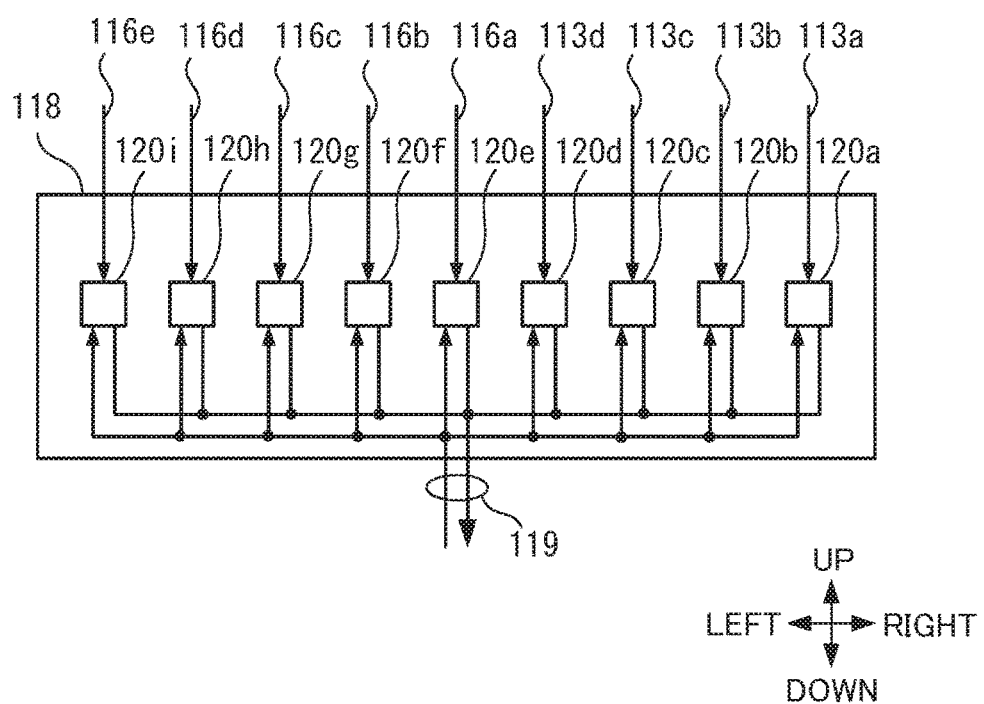
FIG. 4 is a drawing illustrating an example configuration of a switch of Embodiment 1.

In particular, as shown in an example of such a configuration illustrated in FIG. 4, the switch 118 is equipped with switching elements 120*a-i* connected respectively to the four first lines 113*a-d* and the five second lines 116*a-e*. Each of the switching elements 120*a-i*, for example, is an element such as a transistor.

The switching elements 120*a-i* switch between a connected state and a disconnected state on the basis of the switch control signal. The switching of state by the switching elements 120*a-i*, for example, is performed simultaneously. The connected state is a state that allows conduction between the switch-control device line 119 and the four first lines 113*a-d* and the five second lines 116*a-e*. The disconnected state is a state that electrically blocks the switch-control device line 119 from the four first lines 113*a-d* and the five second lines 116*a-e*.

As understood upon reference to the wiring of FIG. 4, when the switching elements 120*a-i* are in the connected state, the four first lines 113*a-d* and the five second lines 116*a-e* are electrically connected. In the above described manner, the four first lines 113*a-d* are connected respectively to the four first electrodes 112, and the five second lines 116*a-e* are connected respectively to the five second electrodes 115. Thus in the state in which the switching elements 120*a-i* are connected, each of the four first electrodes 112 and each of the five second electrodes 115 are in a state of electrical interconnection. Thus the four first electrodes 112 and the five second electrodes 115 form an equipotential electrode, referred to hereinafter as a "planar electrode", having a wide planar shape.

The signal output from the planar electrode formed in the connected state through the first lines 113*a-d*, second lines 116*a-e*, switch 118, and switch-control device line 119 indicates the potential of the planar electrode. Thereafter when the user approaches the touch panel 103, which is in the connected state, the potential thereof changes in accompaniment with change in capacitance of the planar electrode.

Thus change of capacitance of the planar electrode can be detected, and the approach of the user to the touch panel 103 can be detected, on the basis of the signal output via the switch-control device line 119 in the aforementioned manner from the planar electrode in the connected state. In this manner, the touch panel 103 in the connected state can be used as a proximity sensor.

Here, the approach of the user is detected on the basis of change of the capacitance of the planar electrode rather than change of the capacitance of the individual first electrodes 112 and second electrodes 115, thus enabling broadening of the space (detection range) in which approach of a person to the touch panel 103 can be detected. Such a detection range is the range between the touch panel 103 and, for example, a location positioned about 1 m away from the touch panel 103.

The signal output through the switch-control device line 119 from the planar electrode in the connected state is referred to hereinafter as a "proximity detection signal". Further, the space in which the touch panel 103, in the connected state, can detect the approach of the user is referred to as a "detection range".

Further, when the switching elements 120*a-i* enter the disconnected state, as may be understood upon reference to FIG. 2 and FIG. 4, the four first lines 113*a-d* and the five second lines 116*a-e* are not electrically interconnected. Further, the four first electrodes 112 are not electrically interconnected, and the five second electrodes 115 are not electrically interconnected. Thus when the switching elements 120*a-i* are in the disconnected state, each of the four first electrodes 112 and each of the five second electrodes 115 are in the disconnected state and without electrical interconnection. Thus the four first electrodes 112 and the five second electrodes 115 are electrically independent from one another, that is, are isolated electrodes that may have mutually different potentials.

The signals output from each of the first electrodes 112 and second electrodes 115 in the disconnected state through the first lines 113*a-d* and the second lines 116*a-e* indicate the respective potentials of the first electrodes 112 and second electrodes 115. Further, when the user touches the touch panel 103 in the disconnected state, potential of the first electrode 112 and second electrode 115 in the vicinity of the contact location changes with the change of capacitance of the first electrode 112 and second electrode 115. For example, when the user touches the location indicated by the "X" mark P illustrated in FIG. 2, with the change of capacitance of the first electrodes 112 connected to the first lines 113*a* and 113*b* and the change of capacitance of the second electrodes 115 connected to the second lines 116d and 116e, potentials of these electrodes change.

Thus, in the disconnected state, change of capacitance of each of the first electrodes 112 and second electrodes 115 is detected on the basis of the signals output through the first lines 113a-d and the second lines 116a-e from the respective first electrode 112 and second electrode 115, and the location on the touch panel 103 touched by the user can be detected. In this manner, the touch panel 103 in the disconnected state can be used as a capacitive touch panel. Hereinafter, the signal output from the respective first electrode 112 and second electrode 115 through the first lines 113a-d and the second lines 116a-e in the disconnected state is termed a "contact location detection signal".

Here, the expression "capacitive touch panel" refers to a touch panel for detection, when the finger and the like of the user touches the touch panel 103, of the location of user contact on the basis of change of capacitance of vertically and laterally arranged electrodes. Further, although the touch panel 103 is typically operated by the finger of the user, operation may also be performed using a pen-like tool and the like.

In reference to FIG. 2, for example, the control device 104 acquires the contact location detection signal through each of the first lines 113a-d and second lines 116a-e when the first electrodes 112 and second electrodes 115 are in the disconnected state. Further, the control device 104 acquires the proximity detection signal through the switch-control device line 119 when the first electrodes 112 and the second electrodes 115 are in the connected state. Thereafter, the control device 104 controls overall operation of the remote controller 100, including the touch panel 103, on the basis of the acquired contact location detection signal or proximity detection signal.

Figure 5:
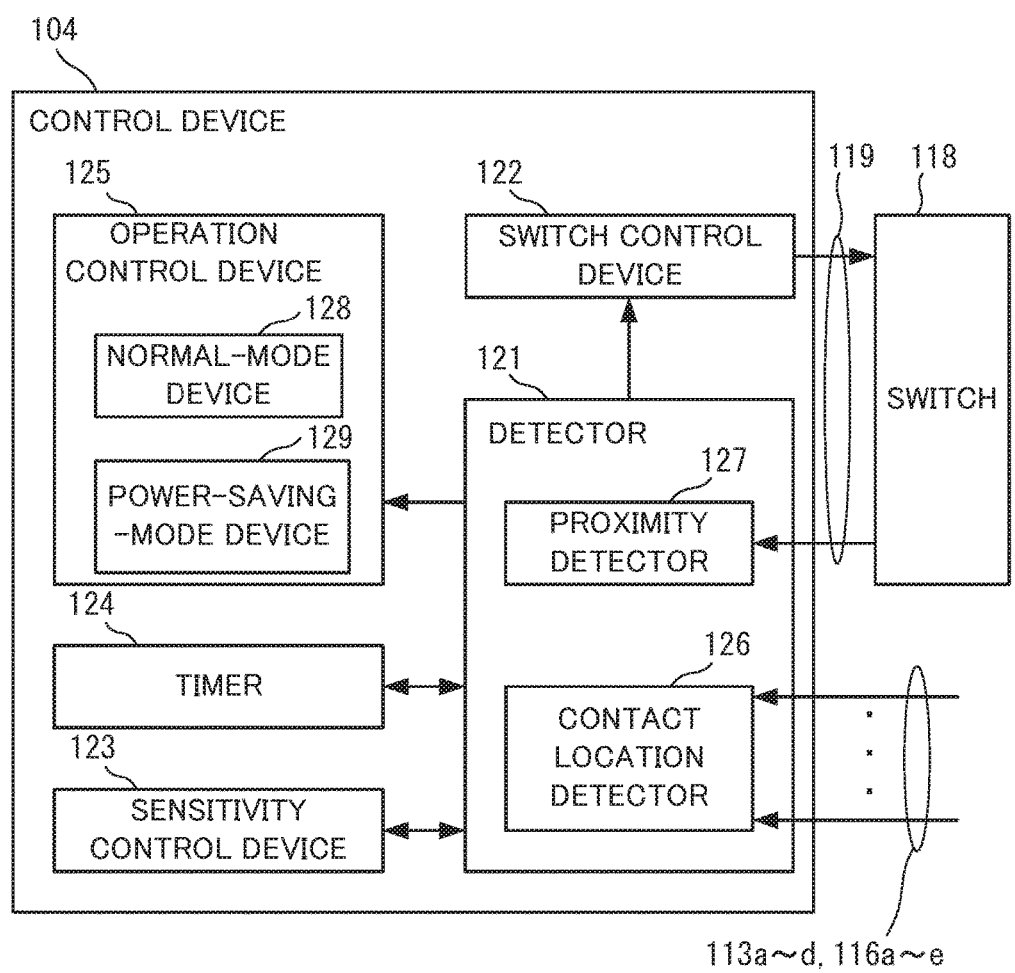
FIG. 5 is a drawing illustrating configuration of a control device of Embodiment 1.

In particular, as illustrated by the functional configuration of FIG. 5, the control device 104 includes: a detector 121 for detecting the change of capacitance of the first electrodes 112 and second electrodes 115 and detecting approach or contact location of the user on the basis of the result of detected change of capacitance, a switch control device 122 for controlling the switch 118, a sensitivity control device 123 for controlling detection sensitivity of the detector 121, a timer 124 for measuring elapsing of a predetermined touch detection time, and an operation control device 125 for controlling operation of the remote controller 100 in accordance with a normal mode or power-saving mode.

As illustrated in FIG. 5, the detector 121 includes a contact location detector 126 and a proximity detector 127, and contact location or approach is detected through switching between the contact location detector 126 and the proximity detector 127 based on which processor detects change of capacitance.

The contact location detector 126 is a processor for detection of the contact location of the user on the touch panel 103 when in the disconnected state. In particular, the contact location detector 126 acquires the contact location detection signal when in the disconnected state. The contact location detector 126 detects the contact location of the user on the touch panel 103 on the basis of changes of the capacitances of each of the first electrodes 112 and second electrodes 115 indicated by the contact location detection signal. Further, when the contact location is detected, the contact location detector 126 outputs to the timer 124 a notification (touch notification) that indicates that the touch panel 103 is touched by the user.

Upon elapsing of the touch detection time, the contact location detector 126 changes the processor of the detector 121 to the proximity detector 127. Nearly simultaneously with this change, the contact location detector 126 outputs, to the switch control device 122, sensitivity control device 123, and operation control device 125, a notification (first notification) that the detection of contact location is completed.

Here, the touch detection time is a predetermined time, for example, as 30 seconds or 1 minute, for the contact location detector 126 to detect the contact location of the user, and in the present embodiment, is predetermined as the time in which the user does not touch the touch panel 103 in the time period when the processor of the detector 121 is the contact location detector 126.

Further, in the connected state, even though the signal passing through the first line 113a-d and second lines 116a-e is input to the contact location detector 126, performing processing on the signal by the contact location detector 126 is optional.

In the connected state, the proximity detector 127 is the processor for detection of the approach of the user to the touch panel 103. In particular, in the connected state, the proximity detector 127 acquires the proximity detection signal. The proximity detector 127 detects the approach of the user to the touch panel 103 on the basis of the change of capacitance of the planar electrode indicated by the proximity detection signal.

Upon detection of the approach of the user, the proximity detector 127 changes the processor of the detector 121 to the contact location detector 126. Nearly simultaneously with this change, the proximity detector 127 outputs to the switch control device 122, sensitivity control device 123, timer 124, and operation control device 125 a notification (second notification) indicating that the detection of approach of the user is completed.

Upon the elapsing of the touch detection time, the switch control device 122 causes the switch 118 to switch from the disconnected state to the connected state. Further, when the proximity detector 127 detects the approach of the user, the switch control device 122 causes the switch 118 to switch from the connected state to the disconnected state.

In particular, upon acquisition of the second notification from the proximity detector 127, the switch control device 122 outputs to the switch 118 the switch control signal for setting to the disconnected state. Due to this output, the switch control device 122 causes the switch 118 to switch from the connected state to the disconnected state.

Further, upon acquisition of the first notification from the contact location detector 126, the switch control device 122 outputs to the switch 118 the switch control signal for setting to the connected state. By such output, the switch control device 122 causes the switch 118 to switch from the disconnected state to the connected state.

Upon elapsing of the touch detection time, the sensitivity control device 123 sets sensitivity for detection of capacitance by the detector 121 to a predetermined high sensitivity. Further, upon the proximity detector 127 detecting the approach of the user, the sensitivity control device 123 sets the sensitivity for detection of capacitance by the detector 121 to a predetermined low sensitivity.

In particular, upon acquiring the second notification from the proximity detector 127, the sensitivity control device 123 sets detection sensitivity of the detector 121 to a predetermined high sensitivity. Upon acquisition of the first notification from the contact location detector 126, the sensitivity control device 123 sets detection sensitivity of the detector 121 to a predetermined low sensitivity. As a result of control of the sensitivity control device 123 in this manner, sensitivity for the detection of change of capacitance by the proximity detector 127 is higher than the sensitivity of detection of the change of capacitance by the contact location detector 126.

Upon acquisition of the second notification from the proximity detector 127, the timer 124 starts counting the measured time of the touch detection time from zero. Further, upon acquiring the touch notification from the contact location detector 126, the timer 124 again starts from counting the measured time of touch detection time from zero. Such operation enables measurement of the time during which the touch panel 103 is not touched by the user in the time period in which the processor of the detector 121 is the contact location detector 126.

The timer 124 is referenced by the contact location detector 126 at any time, such as every one second. When the time measured by the timer 124 exceeds the touch detection time, the contact location detector 126, in the aforementioned manner, changes the processor of the detector 121 to the proximity detector 127 and outputs the first notification.

Further, the touch detection time may be predetermined as the time period that passes after the start of detection of the contact location by the contact location detector 126, and in this case the timer 124 may continue measuring time, without sending of touch notification by the contact location detector 126, and without the resetting of the measured time to zero after the acquiring of the second notification.

As illustrated in FIG. 5, the operation control device 125 is equipped with a normal-mode device 128 for controlling operation of the remote controller 100 in the normal mode, and a power-saving-mode device 129 for controlling operation of the remote controller 100 in the power-saving mode, and the operation control device 125 switches control of operation of the remote controller 100 between control by either the processor of the normal-mode device 128 or the power-saving-mode device 129.

Here, the normal mode and power-saving mode are examples of different operation modes of the remote controller 100, and the power-saving mode is the operation mode for low power consumption in comparison to the normal mode. The below examples can be cited concerning specific details of the normal mode and power-saving mode, and these examples may be combined as appropriate. For example, a screen is displayed on a display 106 in the normal mode, and the screen is not displayed on the display 106 in the power-saving mode. In another example, a backlight of the display 106 is lighted in the normal mode, and the backlight of the display 106 is turned off in the power-saving mode. In yet another example, the frequency of the CPU is lower in the power-saving mode than in the normal mode.

During the time period when the normal-mode device 128 causes operation of the remote controller 100 in the normal mode, the normal-mode device 128 switches the processor of the operation control device 125 to the power-saving-mode device 129 upon acquiring the first notification from the contact location detector 126.

During the time period when the power-saving-mode device 129 causes operation of the remote controller 100 in the power-saving mode, the power-saving-mode device 129 switches the processor of the operation control device 125 to the normal-mode device 128 upon acquiring the second notification from the proximity detector 127.

The control device 104 physically includes components such as a central processing unit (CPU), a random access memory (RAM), a read only memory (ROM), a solid state drive (SSD), a flash memory, and a capacitance detection circuit. Each of the functions of the control device 104, for example, are realized by the CPU executing a software program preset in ROM while referring to signals from the capacitance detection circuit, a touch panel, and the like. In this case, detection sensitivity of capacitance can be adjusted, for example, by means such as setting of gain of an operational amplifier of the capacitance detection circuit.

The power supply 105 supplies electrical power to the entire remote controller 100, including the touch panel 103.

The display 106, for example, is a full-dot color liquid crystal display panel and includes components such as a liquid crystal panel, a drive circuit for driving the liquid crystal, a color filter, and a light source. Further, the device used as the display 106 may be selected as required, and examples of this device include displays such as monochrome liquid crystal display panels, segment-type liquid crystal display panels, and organic electroluminescence (EL) displays.

In order for the display 106 to display a screen toward the front direction through the touch panel 103, for example, the front surface of the display 106 abuts against the rear surface of the substrate 111 and is fixed to the interior of a cover 108. In the present embodiment, the touch panel 103 is configured to be substantially transparent in the aforementioned manner, and thus the screen displayed by the display 106 can be seen through the touch panel 103.

As illustrated in FIG. 1, the cover 108 has an substantially rectangular opening 109, and the power supply button 107 is arranged at the periphery of the opening 109. Further, the touch panel 103 is exposed to the exterior of the cover 108 through the opening 109, and thus the user can touch the touch panel 103 and the touch panel 103 can detect approach of the user to the touch panel 103. The display 106 can display a screen to the exterior through the touch panel 103 and the opening 109.

Configuration of the remote controller 100 of Embodiment 1 of the present disclosure is described above. Operation of the remote controller 100 of Embodiment 1 is described hereinafter.

Figure 6B:
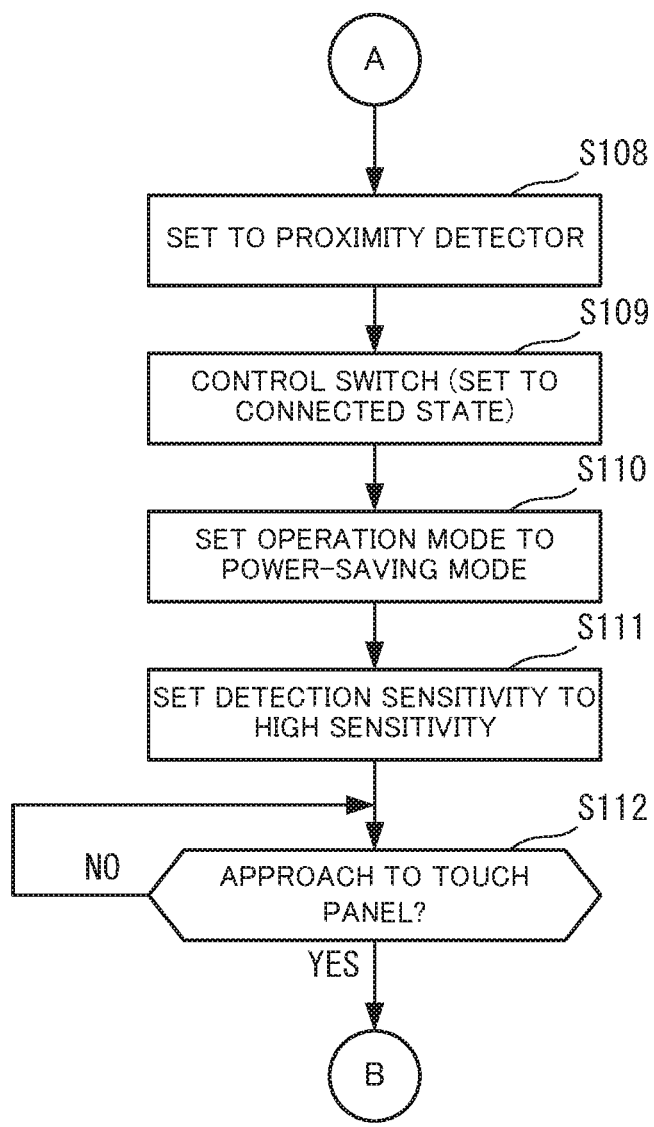
FIG. 6B is a flowchart illustrating main processing of Embodiment 1.

For example, when the air conditioner 101 is turned on by operation of the power supply button 107, the remote controller 100 executes the main processing illustrated in FIG. 6A and FIG. 6B.

The detector 121 sets the processor for detection of change of capacitance to the contact location detector 126 (step S101). At this time, the timer 124 starts counting. The switch control device 122 controls and sets the switch 118 to the disconnected state (step S102). The operation control device 125 causes the normal-mode device 128 to control operation of the remote controller 100, thereby setting the operation mode of the remote controller 100 to the normal mode (step S103). The sensitivity control device 123 sets detection sensitivity of capacitance by the detector 121 to low sensitivity (step S104). Further, the order of the initial execution of processing of step S101 to step S104 may be appropriately changed.

The contact location detector 126 determines whether the user has touched the touch panel 103 (step S105).

In particular, when the user touches the touch panel 103, capacitances change in each of the first electrodes 112 and second electrodes 115 in the vicinity of the contact location. The contact location detector 126 detects the change of capacitance of each of the first electrodes 112 and second electrodes 115 on the basis of the contact location detection signals acquired through the first lines 113a-d and second lines 116a-e from the touch panel 103 in the disconnected state. The contact location detection signals individually indicate different potentials for each of the first electrodes 112 and second electrodes 115, and thus the contact location detection signals can, on the basis of the contact location detection signals, specify the degree of change of capacitance and for which of the four first electrodes 112 and five second electrodes 115 capacitances are changed. The contact location detector 126 detects the contact location of the user on the basis of the change of capacitance of the first electrodes 112 and second electrodes 115, specifically on the basis of the location and the degree of the change of the first electrodes 112 and second electrodes 115 for which capacitance changes. In this manner, the touch panel 103 in the disconnected state functions as a capacitive touch panel. Further, upon detection of the contact location of the user, the contact location detector 126 determines that the user has touched the touch panel 103.

In contrast, if the user does not touch the touch panel 103, there is no change of capacitance for each of the first electrodes 112 and second electrodes 115. Thus when no change of capacitance is detected for each of the first electrodes 112 and second electrodes 115, the contact location detector 126 determines that the user is not touching the touch panel 103.

Upon determination that the touch panel 103 is touched (YES in step S105), the contact location detector 126 outputs the touch notification to the timer 124 and thus resets the timer 124 (step S106). Then the contact location detector 126 returns to the processing of step S105. Due to the resetting of the timer 124, the time that the user is not touching the touch panel 103 in the time period during which the processor of the detector 121 is the contact location detector 126 is recounted from zero.

When the determination is that the user is not touching the touch panel 103 (NO in step S105), the contact location detector 126 references the timer 124 and determines whether the touch detection time has elapsed (step S107). Upon determination that the touch detection time has not elapsed (NO in step S107), the contact location detector 126 returns to the processing of step S105.

When the determination is that the touch detection time has elapsed (YES in step S107), as illustrated in FIG. 6B, the contact location detector 126 changes the processor for detection of change of capacitance by the detector 121 to the proximity detector 127. Due to this change, the processor for detection of change of capacitance by the detector 121 is set to the proximity detector 127 (step S108). At this time, the contact location detector 126 outputs the first notification to the switch control device 122, sensitivity control device 123, and operation control device 125.

Upon acquisition of the first notification from the contact location detector 126, the switch control device 122 controls and sets the switch 118 to the connected state (step S109). Upon acquisition of the first notification from the contact location detector 126, the normal-mode device 128 causes the power-saving-mode device 129 to control operation of the remote controller 100, and thus sets the operation mode of the remote controller 100 to the power-saving mode (step S110). Upon acquisition of the first notification from the contact location detector 126, the sensitivity control device 123 sets the detection sensitivity of capacitance of the detector 121 to high sensitivity (step S111).

Further, rather than being output from the contact location detector 126, the first notification may be output from any one of the switch control device 122, sensitivity control device 123, timer 124, and operation control device 125. In the case of the first notification from any one of the switch control device 122, sensitivity control device 123, and operation control device 125, the processor that is the switch control device 122, sensitivity control device 123, or operation control device 125 may reference the measured time of the timer 124 and may output the first notification upon elapsing of the touch detection time. Further, the order of execution of the processing of the step S108 to step S111 may be modified as required, as long as the processing of outputting the first notification by the processor that is the switch control device 122, sensitivity control device 123, operation control device 125, or contact location detector 126 is initially executed. In the case of outputting the first notification by the timer 124, the order of execution of the processing of the step S108 to step S111 may be modified as required.

The proximity detector 127 determines whether the user has approached the touch panel 103 (step S112).

In particular, when the user approaches the touch panel 103, capacitance of the planar electrode formed by the processing of step S109 changes. The proximity detector 127 detects change of the planar electrode capacitance on the basis of the proximity detection signal acquired in the connected state from the touch panel 103 through the first lines 113a-d, second lines 116a-e, switch 118, and switch-control device line 119. Due to the proximity detection signal indicating potential of the planar electrode, detection of change of capacitance of the planar electrode is possible on the basis of the proximity detection signal.

For example, the proximity detector 127 compares the change of capacitance of the planar electrode to a predetermined threshold value, and detects the approach of the user on the basis of the result of the comparison. More specifically, for example, when the change of capacitance is greater than or equal to the threshold value, the proximity detector 127 determines that the user has approached the touch panel 103. When the change of capacitance is less than the threshold value, the proximity detector 127 determines that the user is not approaching.

Upon determination that the user is not approaching the touch panel 103 (NO in step S112), the proximity detector 127 continues the processing of step S112.

Upon determination that the user has approached the touch panel 103 (YES in step S112), as illustrated in FIG. 6A, the processing of step S101 and beyond is repeated again.

In particular, the proximity detector 127 changes the processor for detection of the change of capacitance to the contact location detector 126, and also outputs the second notification to the switch control device 122, sensitivity control device 123, timer 124, and operation control device 125. Thus the processor for detecting the change of capacitance by the detector 121 is set to the location detector 126 (step S101). Upon acquiring the second notification from the contact location detector 126 at this time, the timer 124 starts counting. Further, upon acquiring the second notification signal from the contact location detector 126, each of the switch control device 122, operation control device 125, and sensitivity control device 123 execute the processing of step S102 to step S104.

Further, rather than being output from the proximity detector 127, the second notification may be output from any one of the switch control device 122, sensitivity control device 123, and operation control device 125. In the case of output of the second notification from the switch control device 122, sensitivity control device 123, or operation control device 125, the processor that is the switch control device 122, sensitivity control device 123, or operation control device 125 may receive notification from the proximity detector 127 indicating detection of the approach of the user, and may output the second notification. Further, the order of execution of the processing of step S101 to step S104 may be modified as required, as long as the initial execution of the processing to output the second notification is performed by the processor that is the switch control device 122, sensitivity control device 123, operation control device 125, and proximity detector 127.

In the present embodiment, detection of the contact location can be performed on the basis of the change of capacitance of each of the four first electrodes 112 and each of the five second electrodes 115 in the disconnected state. Further, due to the formation of the planar electrode by the four first electrodes 112 and five second electrodes 115 in the connected state, the approach of the user can be detected on the basis of the change of the static capacitance of the planar electrode. This configuration spreads in a planar manner the electrode for detection of the user, and thus makes possible widening of the detection range in which the approach of the user can be detected.

In the present embodiment, upon elapsing of the touch detection time, the switch control device 122 causes the switch 118 to change from the disconnected state to the connected state. This configuration enables the touch panel 103 to function as a proximity sensor upon elapse of the touch detection time. Further, upon detection by the proximity detector 127 of approach of the user, the switch control device 122 causes change of the switch 118 from the connected state to the disconnected state. This enables the touch panel 103 to function as a capacitive type touch panel upon the user approaching the touch panel 103.

In the present embodiment, upon detection of the approach of the user by the proximity detector 127, the operation control device 125 causes the remote controller 100 to operate in the normal mode. Due to this configuration, upon approach of the touch panel 103 by the user, the operation mode can return to the normal mode even through the user performs no operation. For example, the screen of the display 106 is made to disappear in power-saving mode and then is made to appear upon the user approaching the touch panel 103, thereby enabling the user to refer to the screen without performing an operation, and for example, enabling confirmation of the present settings and the like. Thus convenience for the user can be improved.

Further, in the time period in which the remote controller 100 is made to operate in the normal mode, the operation control device 125 can make the remote controller 100 operate in the power-saving mode upon elapse of the touch detection time. Due to this configuration, power-saving control is possible in the time period in which the user does not use the touch panel 103.

In the present embodiment, by the sensitivity control device 123 controlling detection sensitivity of capacitance by the detector 121, detection sensitivity of capacitance by the proximity detector 127 becomes higher than detection sensitivity of capacitance by the contact location detector 126. This configuration enables widening of the detection range.

Although Embodiment 1 of the present disclosure is described above, Embodiment 1 may be modified as described below.

For example, the equipment (mount apparatus) on which the input device 102 is mounted is not limited to a remote controller 100, and may be, for example, apparatus such as automatic ticket vending machines, automatic vending machines, tablet terminals, smart phones, and automated teller machines (ATMs). Further, in the case of the touch panel 103 being used on the remote controller 100, the target of control of the remote controller 100 is not limited to the air conditioner 101, and the target may be various types of equipment such as lighting equipment, television receivers, and floor heaters.

Further, for example, the upward direction in the present embodiment corresponds to a first direction, and the lateral direction in the present embodiment corresponds to a second direction. However, the first direction and the second direction are not necessarily orthogonal.

MODIFIED EXAMPLE 1

In the connected state of Embodiment 1, all of the first electrodes 112 and the second electrodes 115 are electrically connected. However, at least two of the first electrodes 112 may be connected together, at least two of the second electrodes 115 may be connected together, or at least one of the first electrodes 112 and at least one of the second electrodes 115 may be connected together.

Figure 7:
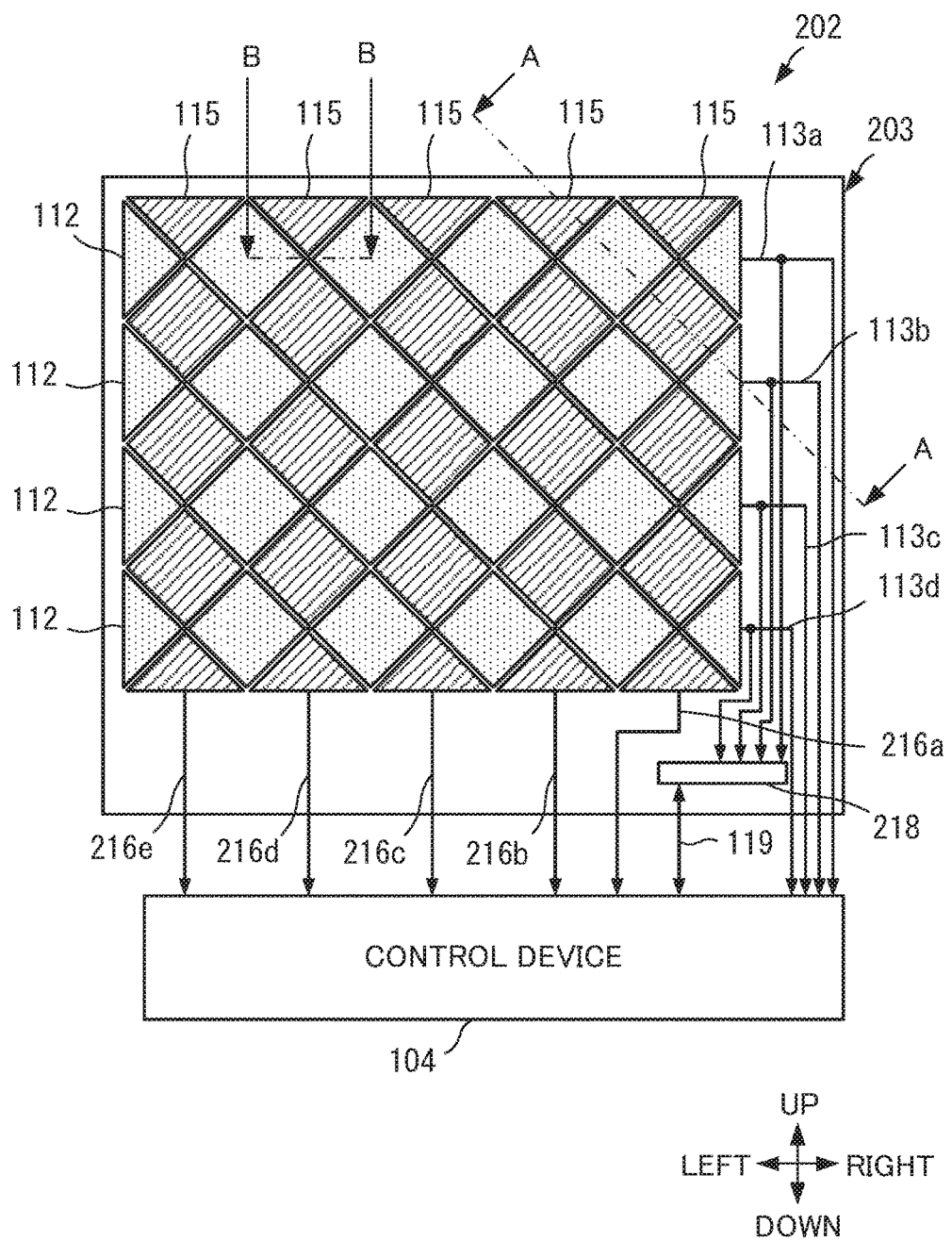
FIG. 7 is a front view of an input device of Modified Example 1.

In FIG. 7, an example configuration is illustrated in which four of the first electrodes 112 are electrically connected in the connected state. As may be understood from the same figure, in a touch panel 203 included in an input device 202 of the present modified example, second lines 216a-e are connected to the control device 104 without branching, and are not connected to a switch 218. Due to this configuration, only the four first electrodes 112 are electrically connected, and the proximity detection signal output from the switch 218 in the connected state indicates the change of capacitance of the electrode formed by the four first electrodes 112.

MODIFIED EXAMPLE 2

Figure 8:
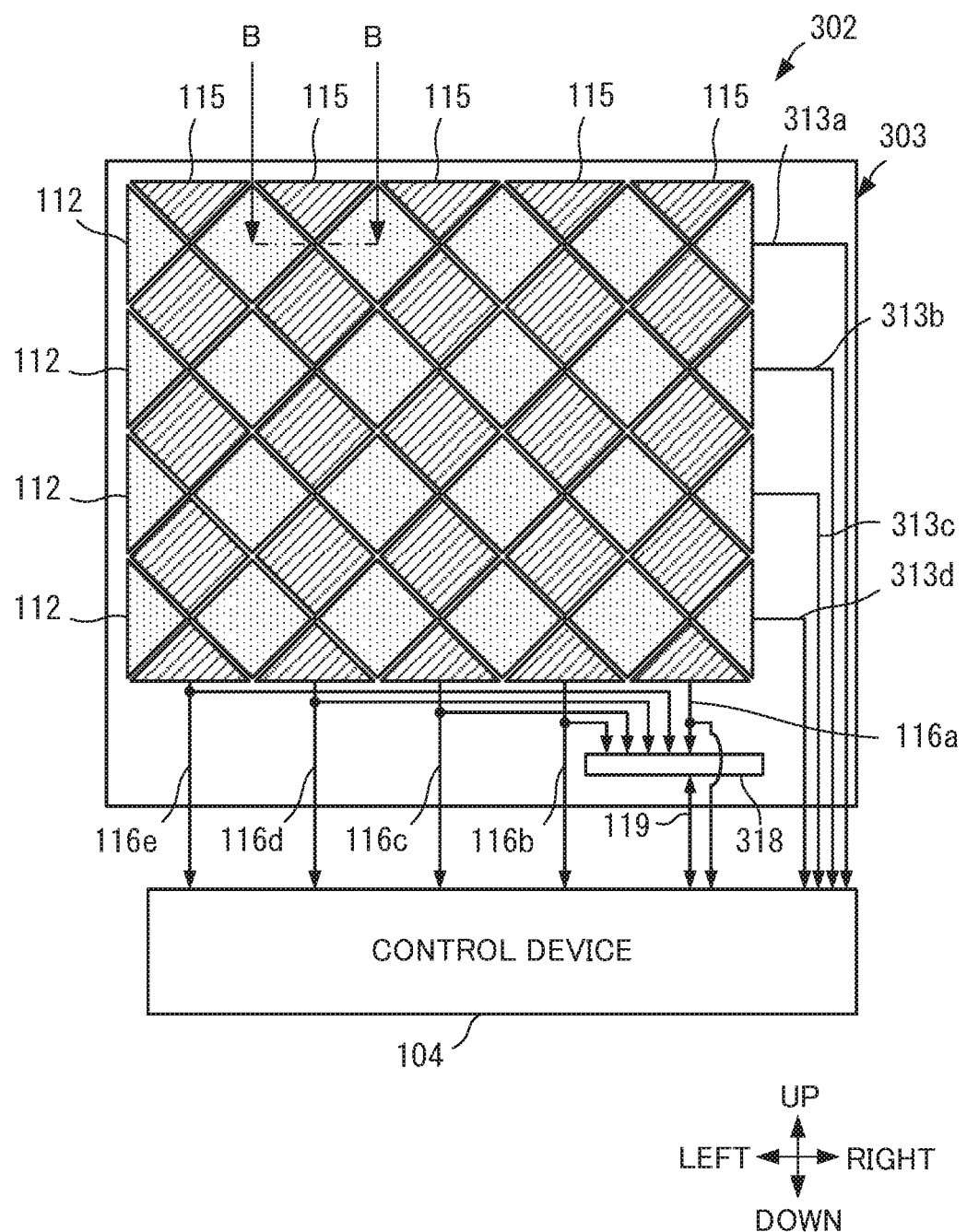
FIG. 8 is a front view of an input device of Modified Example 2.

In FIG. 8, an example configuration is illustrated in which five of the second electrodes 115 are electrically connected in the connected state. As may be understood from the same figure, in a touch panel 303 included in an input device 302 of the present modified example, first lines 313a-e are connected to the control device 104 without branching, and are not connected to a switch 318. Due to this configuration, only the five second electrodes 115 are electrically connected, and the proximity detection signal output from the switch 318 in the connected state indicates the change of capacitance of the electrode formed by the five second electrodes 115. Also in the present modified example, the lateral direction corresponds to the first direction, and the vertical direction corresponds to the second direction.

The Modified Examples 1 and 2 are not limiting, and in the connected state, at least two of the first electrodes 112, at least two of the second electrodes 115, or at least one of the first electrodes 112 and at least one of the second electrodes 115 may be interconnected. Due to the modified examples configured in this manner, the equipotential electrode having a wide planar shape is formed in the connected state, thereby enabling detection of the approach of the user by the electrode that has such a wide planar shape. The electrode for detection of the user has a wide planar shape, thereby enabling broadening of the detection range in which detection of approach of the user is possible.

Embodiment 2

Figure 9:
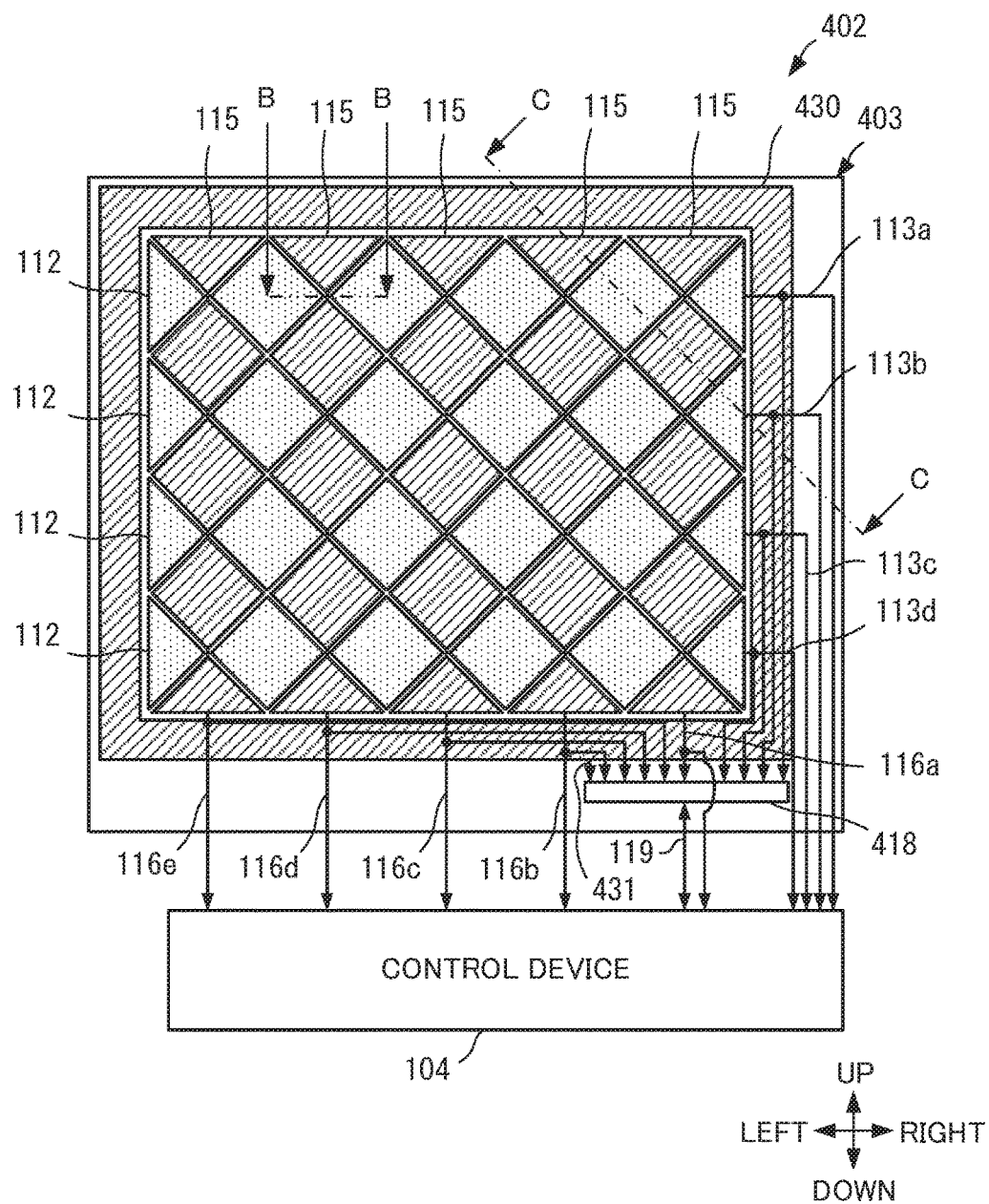
FIG. 9 is a front view of an input device of Embodiment 2 of the present disclosure.
Figure 10:
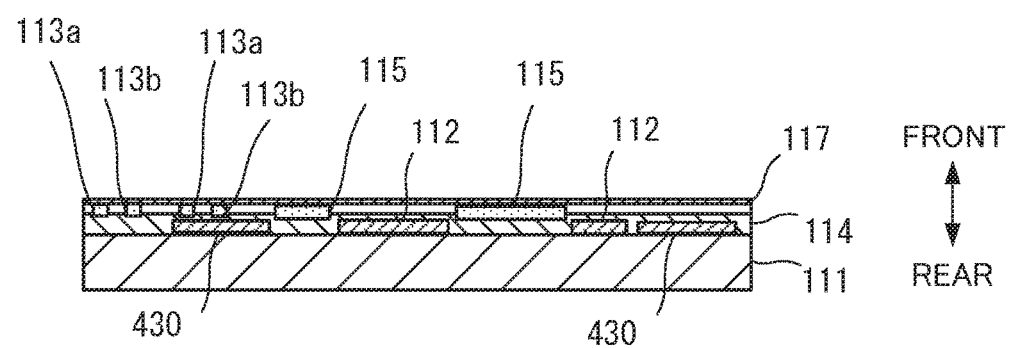
FIG. 10 is a cross-sectional view along line C-C in FIG. 9.

A touch panel 403 included in an input device 402 of the present embodiment, as in FIG. 9 illustrated in a front view of the touch panel 403 and as in FIG. 10 illustrating a cross-sectional view along line C-C in FIG. 9, includes a third electrode 430 and a third line 431 in addition to the configuration of the touch panel 103 of Embodiment 1.

As viewed from the front direction, which corresponds to the direction perpendicular to the substrate 111, the third electrode 430 is a frame-like electrode disposed at the periphery of, and separated from, the four first electrodes 112 and five second electrodes 115. Thus the third electrode 430 itself is not electrically connected to the first electrodes 112 and second electrodes 115. Further, the third electrode 430 is disposed at the periphery of the display 106 as viewed from the front, and thus is not necessarily transparent, and may be a component such as a non-transparent metal plate.

The third line 431 interconnects the third electrode 430 and a switch 418.

The switch 418 is configured so as to, in the connected state, electrically connect the third electrode 430 with the four first electrodes 112 and five second electrodes 115. In the disconnected state, each of the first electrodes 112, each of the second electrodes 115, and the third electrode 430 are not electrically interconnected.

The remote controller including the touch panel 403 of the present embodiment may operate in the same manner as in Embodiment 1.

The present embodiment has effects similar to those of Embodiment1.

In the present embodiment, the providing of the third electrode 430 in addition to the four first electrodes 112 and five second electrodes 115, as viewed from the front, forms an equipotential electrode that has a planar shape that is even wider than the planar shape of the touch panel 103 of Embodiment 1. Thus approach of the user can be detected by the electrode that has a wide planar shape. This configuration enables widening of the planar shape of the electrode for detection of the user, thereby enabling further broadening of the detection range.

Further, at the periphery of the first electrodes 112 and second electrodes 115, the substrate 111 generally often has a region for arrangement of lines and the like. The third electrode 430 can be arranged in the region of the substrate 111 where the first electrodes 112 and second electrodes 115 are not arranged. Thus there is hardly any increase in the size of the touch panel 403 in order to provide the third electrode 430.

MODIFIED EXAMPLE 3

Figure 11:
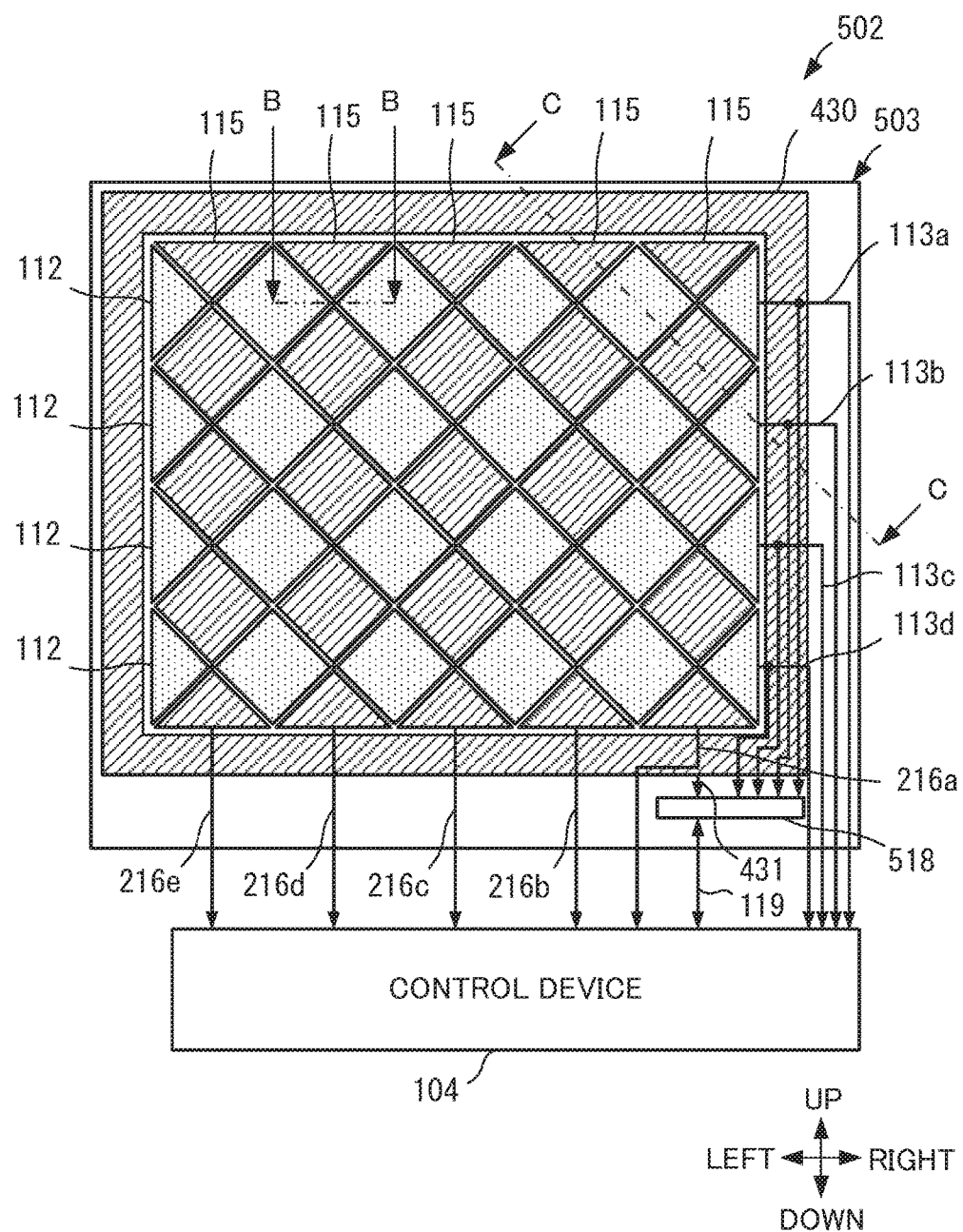
FIG. 11 is a front view of an input device of Modified Example 3.

As illustrated in FIG. 11, a touch panel 503 included in an input device 502 of the present modified example corresponds to a touch panel using the third electrode 430 of Embodiment 2 in the touch panel 203 of Modified Example 1.

MODIFIED EXAMPLE 4

Figure 12:
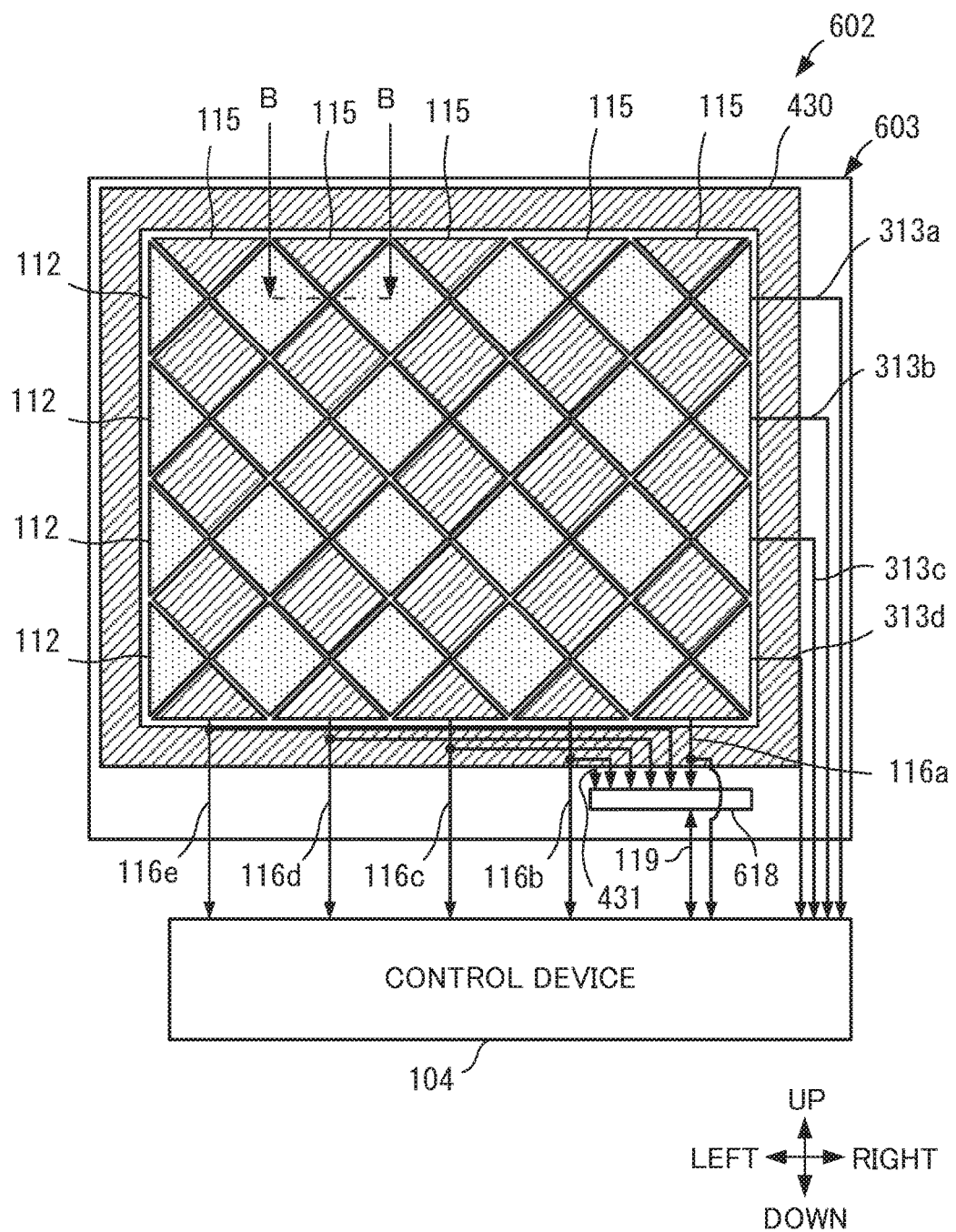
FIG. 12 is a front view of an input device of Modified Example 4.

As illustrated in FIG. 12, a touch panel 603 included in an input device 602 of the present modified example corresponds to a touch panel using the third electrode 430 of Embodiment 2 in the touch panel 303 of Modified Example 2.

The Modified Examples 3 and 4 are not limiting, and in the connected state, the third electrode 430 of Embodiment 2 may be connected to at least one of the first electrodes 112, at least one of the second electrodes 115, or at least one of the first electrodes 112 and at least one of the second electrodes 115. Due to the modified example configured in this manner, in the connected state, the third electrode 430 is connected to all or at least one of the first electrodes 112, to all or at least one of the second electrodes 115, or at least one of the first electrodes 112 and at least one of the second electrodes 115. Thus in the connected state, the providing of the third electrode 430 forms the equipotential electrode that has a wide planar shape, and thus enables detection of the approach of the user by the electrode that has a wide planar shape. The electrode for detection of the user has a planar shape that can be widened in this manner, thereby enabling further broadening the detection range.

MODIFIED EXAMPLE 3

Figure 13:
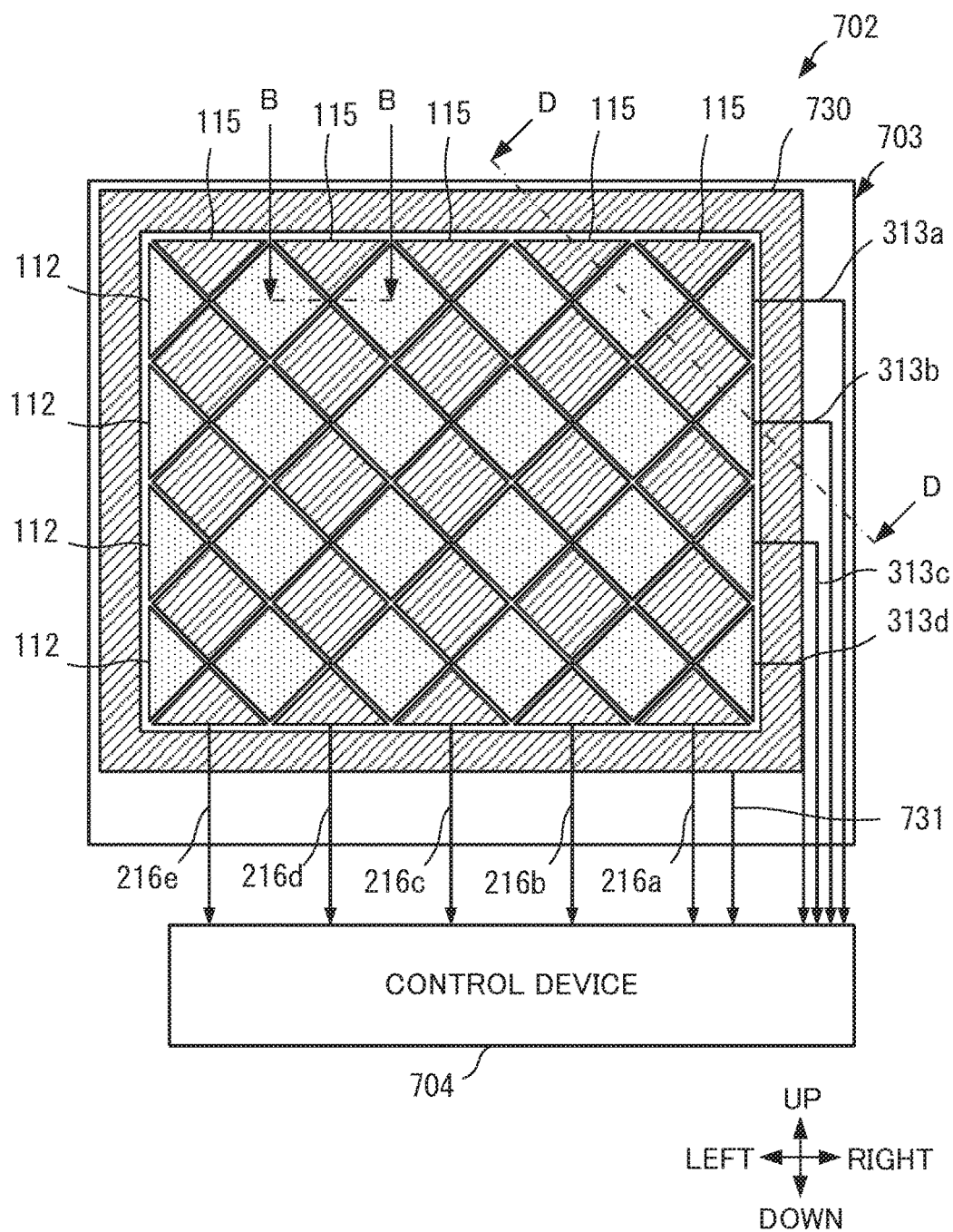
FIG. 13 is a front view of an input device of Embodiment 3 of the present disclosure.
Figure 14:
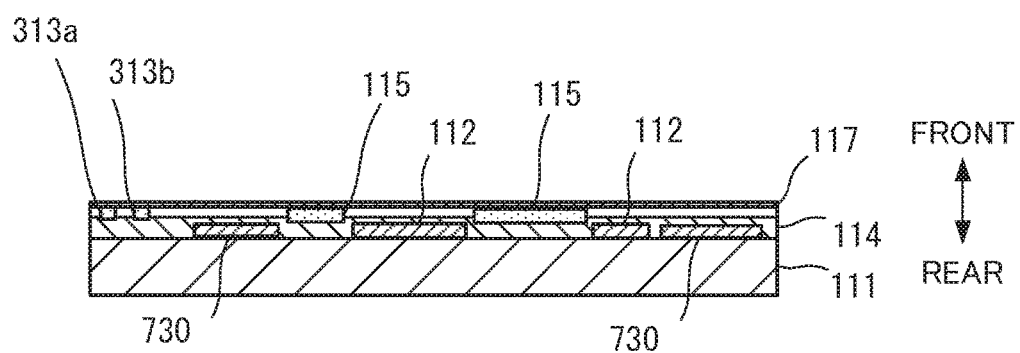
FIG. 14 is a cross-sectional view along line D-D in FIG. 13.

A touch panel 703 included in an input device 702 of the present embodiment, as in FIG. 13 illustrating a front view of the touch panel 703 and as in FIG. 14 illustrating a cross-sectional view along line D-D of FIG. 13, includes: the first lines 313a-d in the same manner as in Modified Example 2, rather than the first lines 113a-d provided for the touch panel 103 of Embodiment 1; and the second lines 216a-e in the same manner as in Modified Example 1, rather than the second lines 116a-e provided for the touch panel 103 of Embodiment 1, and a control device 704 rather than the control device 104 provided for the touch panel 103 of Embodiment 1. The touch panel 703 is further equipped with a third line 731 and the third electrode 430 of Embodiment 2. Further, the touch panel 703 is not equipped with the switch 118. Except for these exceptions, the touch panel 703 and the touch panel 103 of Embodiment 1 are configured in a roughly similar manner.

The third line 731 outputs to the control device 704 the proximity detection signal that indicates the potential of the third electrode 430. Thus change of capacitance of the third electrode 430 can be detected on the basis of the proximity detection signal.

Figure 15:
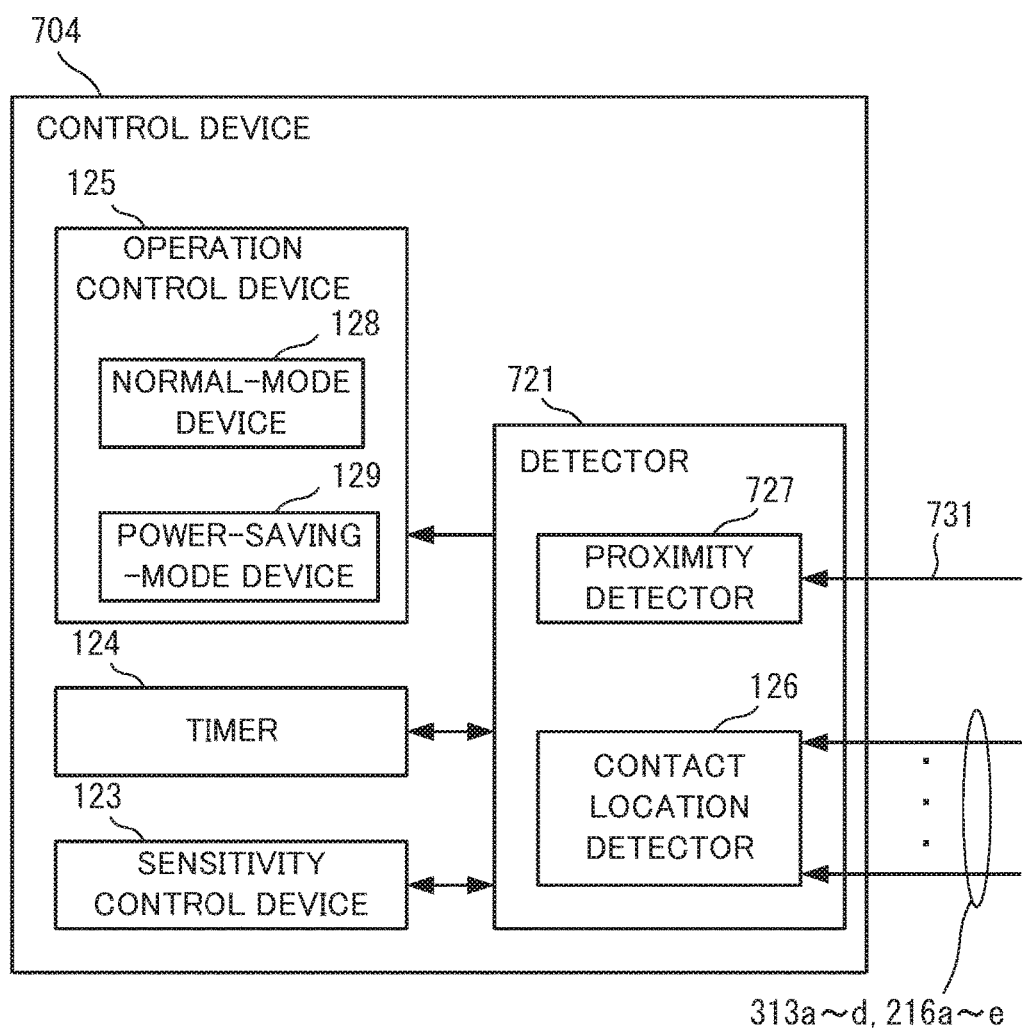
FIG. 15 is a drawing illustrating configuration of a control device of Embodiment 3.

As illustrated in FIG. 15, the control device 704 is equipped with a proximity detector 727 of a detector 721, rather than the proximity detector 127 of the detector 121 of the control device 104 of Embodiment 1. Except for these exceptions, the control device 704 and the control device 104 of Embodiment 1 are configured in a roughly similar manner.

The proximity detector 727 acquires the proximity detection signal through the third line 731. The proximity detector 727 detects change of capacitance of the third electrode 430 on the basis of the proximity detection signal, and detects the approach of the user to the touch panel 703.

The remote controller that includes the touch panel 703 of the present embodiment executes the main processing illustrated in FIG. 16A and FIG. 16B. As may be understood from both of the figures, the control device 704 of the present embodiment does not execute the processing of steps S102 and S109 illustrated in FIG. 6A and FIG. 6B. Except for these exceptions, the main processing of Embodiment 1 and the main processing of the present embodiment are roughly similar.

According to the present embodiment, in the same manner as in the case of the disconnected state in Embodiment 1, detection of the contact location is enabled on the basis of the change of capacitance of the four first electrodes 112 and five second electrodes 115. Further, the third electrode 430 is an equipotential electrode that has a wide planar shape, and thus the approach of a person can be detected by the electrode that has this wide planar shape. The electrode for detection of the user has a planar shape that can be widened in this manner, thereby enabling broadening of the detection range in which the approach of the user can be detected.

The present embodiment differs from Embodiment 1 in that the contact location detector 126 and the proximity detector 727 can be made to operate simultaneously. However, in the same manner as Embodiment 1, the contact location detector 126 may detect the contact location of the user until the touch detection time has elapsed after the proximity detector 727 detects the approach of the user. This configuration enables limitation of the time period during which electrical power is supplied to the contact location detector 126, first electrodes 112, and second electrodes 115, and thus power consumption can be suppressed. Further, after elapse of the touch detection time, the proximity detector 727 may detect the approach of the user until detection of the approach of the user. This configuration enables limitation of the time period of supply of electrical power to the proximity detector 727 and third electrode 730, and thus makes possible suppression of power consumption.

In the present embodiment, when the proximity detector 727 detects the approach of the user, the operation control device 125 operates the remote controller 100 in the normal mode in the same manner as in Embodiment 1. Due to this configuration, even without execution of any operation by the user, the operation mode can return to the normal mode when the user approaches the touch panel 103. For example, by disappearance of the screen of the display 106 in power-saving mode, and then display of this screen upon the user approaching the touch panel 103, the user can refer to the screen without performing an operation, and for example, can confirm the present settings and the like. Thus convenience for the user can be improved in the same manner as in Embodiment 1.

Further, in the time period in which the remote controller 100 is made to operate in the normal mode, when the touch detection time elapses, the operation control device 125 causes operation of the remote controller 100 in the power-saving mode. This configuration enables suppression of power consumption in the time period in which the user does not use the touch panel 103.

According to the present embodiment, due to the sensitivity control device 123 controlling detection sensitivity of capacitance by the detector 721, the detection sensitivity of capacitance by the proximity detector 727 becomes higher than the detection sensitivity of capacitance by the contact location detector 126 in the same manner as in Embodiment 1. This configuration enables broadening of detection range in the same manner as in Embodiment 1.

As described in Embodiment 2, the third electrode 430 can be arranged in a region of the substrate 111 in which the first electrodes 112 and second electrodes 115 are not arranged. Thus there is almost no increase in the size of the touch panel 703 in order to provide the third electrode 430.

Embodiment 4

Figure 17:
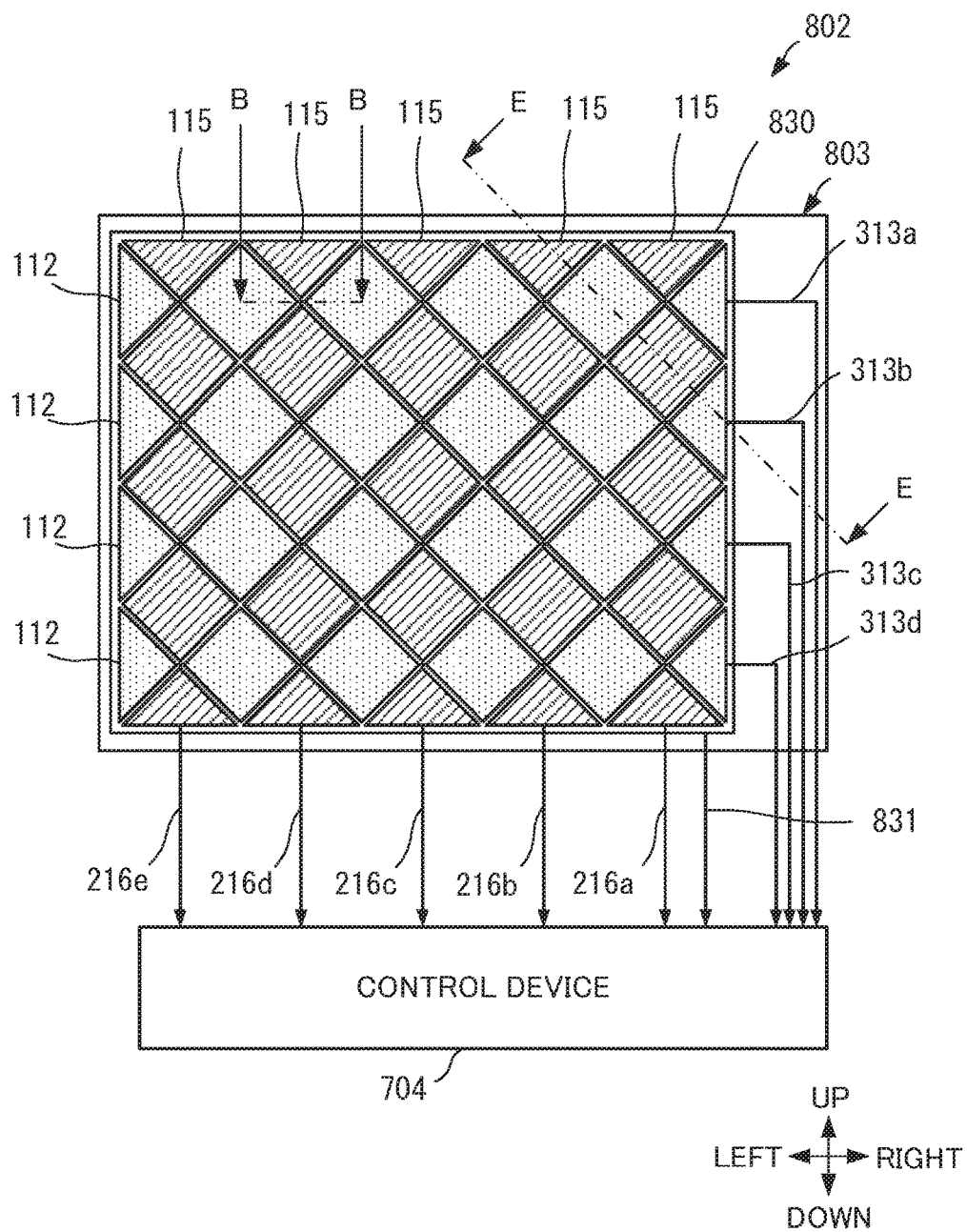
FIG. 17 is a front view of an input device of Embodiment 4 of the present disclosure.
Figure 18:
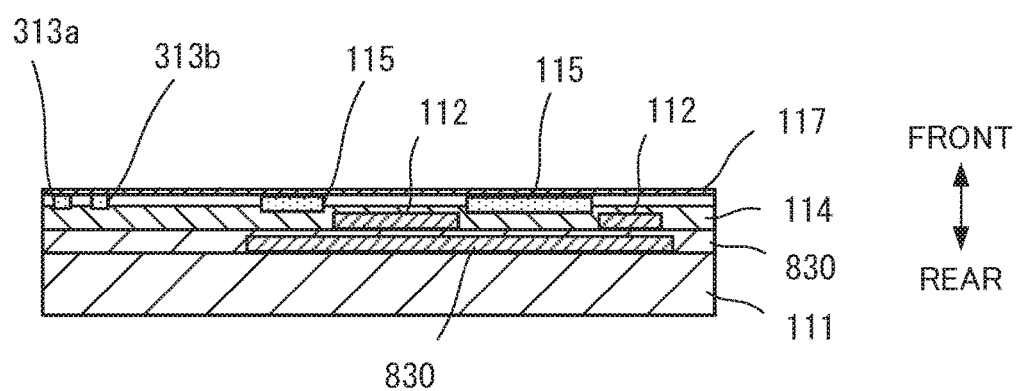
FIG. 18 is a cross-sectional view along line E-E in FIG. 17.

A touch panel 803 included in an input device 802 of the present embodiment, as illustrated in a front view of the touch panel 803 in FIG. 17 and in FIG. 18 illustrating a cross-sectional view along line E-E in FIG. 17, is equipped with a third electrode 830 and a third line 831, rather than the third electrode 730 and third line 731 provided for the touch panel 703 of Embodiment 3. Except for these exceptions, the touch panel 803 and the touch panel 703 of Embodiment 3 are configured in a roughly similar manner.

As viewed from the front direction, which corresponds to the direction perpendicular to the substrate 111, the third electrode 830 is a planar electrode that is arranged overlapping the four first electrodes and five second electrodes. The third electrode 830 may have a wide planar shape, and for example, may be formed without gaps as viewed from the front direction, or for example, may be formed as with a lattice shape that has gaps.

In the present embodiment, the third electrode 830 is arranged on the substrate as illustrated in FIG. 18. Thus the third electrode 830 may be formed, for example, mainly from a transparent material such as ITO to make the screen visible from the front of the display 106.

Figure 19:
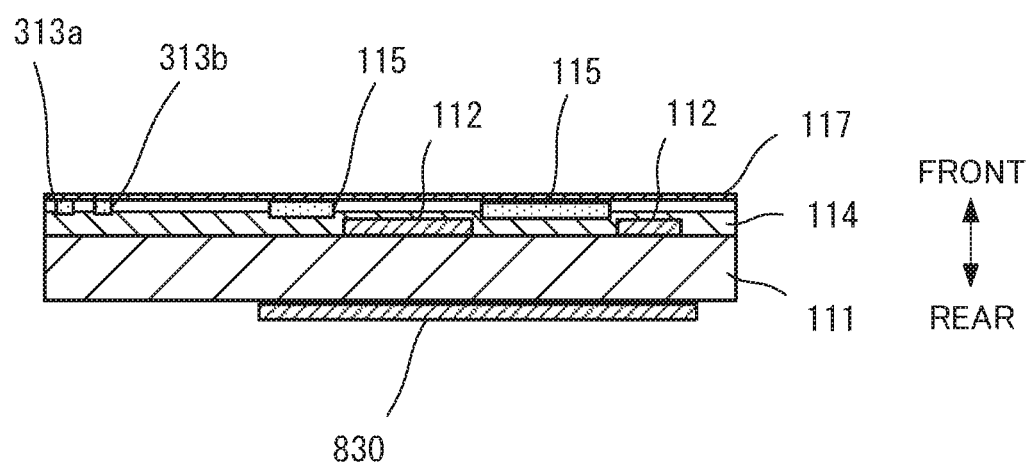
FIG. 19 is a cross-sectional view, along a line corresponding to line E-E in FIG. 17, of an input device of Modified Example 5.
Figure 20:
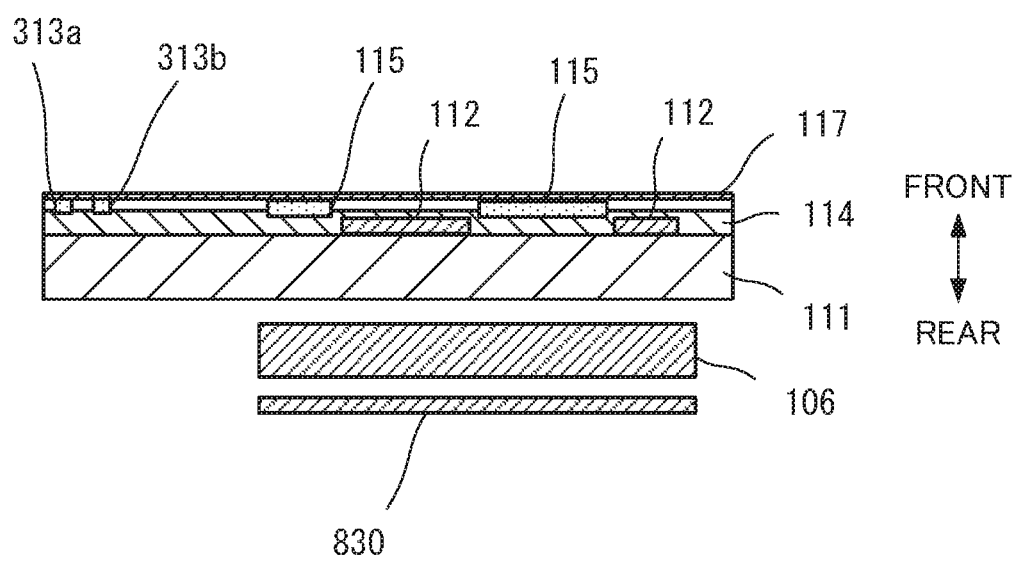
FIG. 20 is a cross-sectional view, along a line corresponding to line E-E in FIG. 17, of an input device of Modified Example 6.

Further, the third electrode 830 may be arranged at the back surface of the substrate 111 as illustrated in FIG. 19, or may be arranged at the rear of the display 106 as illustrated in FIG. 20. In the case of arrangement at the rear of the display 106, due to positioning so as not to block the screen of the display 106, the third electrode 830 may be a non-transparent metal plate and the like.

The third line 831 interconnects the third electrode 830 and the control device 704. In the same manner as the third line 731, the third line 831 outputs the proximity detection signal indicating the potential of the third electrode 830 to the proximity detector 727 of the control device 704. This configuration enables detection of change of capacitance of the third electrode 830 on the basis of the proximity detection signal in the same manner as in Embodiment 3, and enables the proximity detector 727 to detect the approach of the user to the touch panel 803.

The remote controller equipped with the touch panel 803 of the present embodiment may operate in the same manner as in Embodiment 3.

The present embodiment has effects similar to those of Embodiment 3.

MODIFIED EXAMPLE 5

In Embodiments 1 to 4, transparent electrodes are used for the substrate 111, first electrodes 112, and second electrodes 115. Further, the third electrode 830 of Embodiment 4 is made transparent in the case of arrangement in front of the display 106. The input device of the present modified example, is provided with a configuration similar to that of any one of the input devices 102, 202, 302, 402, 502, 602, 702, and 802 described in the various embodiments and modified examples, with the exception that the touch panels 103, 203, 303, 403, 503, 603, 703, and 803 are made of a non-transparent material. The input device of the present modified example is used with advantage in a case, such as a touch pad for detection of the contact location of the user, in which the screen of the display 106 does not allow transmission from the backside. In this case, the substrate 111, first electrodes 112, and second electrodes 115 may be a material such as a non-transparent metal. The third electrode 830 may also be a material such as a non-transparent metal.

Further, in the embodiments, although the normal mode corresponds to a first mode and the power-saving mode corresponds to a second mode, this configuration is not limiting, as long as the first mode and the second mode are different operating modes of the mount apparatus of the input device. In the case in which the input device of the present modified example is mounted on a notebook-type personal computer (PC) as the mount apparatus, the notebook-type personal computer may be controlled so as to display a normal operating screen in the first mode, and may be controlled so as to display a screen saver in the second mode.

The present modified example has effects similar to those of each of the embodiments and modified examples using the present modified example Although the present description includes the above embodiments and modified examples (including description below), the present description is not limited to these embodiments and modified examples. The present disclosure includes suitable combinations of the embodiments and modified examples, as well as such combinations with suitable added modifications.

INDUSTRIAL APPLICABILITY

The present disclosure can be used with advantage for remote controllers, automatic ticket vending machines, automatic vending machines, tablet terminals, smart phones, ATMs, and the like.

The invention claimed is:

1. An input device for inputting by touch of a user, comprising:
   first electrodes spaced from one another in a first direction and arranged in side-by-side relation on a substrate;
   second electrodes spaced from one another in a second direction and arranged in side-by-side relation on the substrate, the second direction intersecting the first direction;
   a third electrode separated from, and disposed at a periphery of, the first electrodes and the second electrodes when viewed in a direction perpendicular to the substrate;
   a switch configured to switch between an electrically connected state and an electrically disconnected state, at least one first electrode of the first electrodes and the third electrode being mutually electrically connected so that the at least one first electrode and the third electrode are equipotential in the connected state, each of the first electrodes and the third electrode being electrically disconnected in the disconnected state;
   a contact location detector configured to detect a contact location of the user in accordance with a change in capacitance of each of the first electrodes and each of the second electrodes in the disconnected state; and
   a proximity detector configured to detect approach of the user in accordance with a change in capacitance of the third electrode in the connected state.

2. The input device according to claim 1, wherein the switch is further configured to, in the connected state, mutually electrically connect at least one second electrode of the second electrodes and the at least one first electrode so that the at least one second electrode and the at least one first electrode are equipotential.

3. The input device according to claim 1, further comprising:
   a switch controller configured to
      upon elapse of a touch detection time for the contact location detector to detect the contact location of the user, cause the switch to switch from the disconnected state to the connected state, and
      upon the proximity detector detecting the approach of the user, cause the switch to switch from the connected state to the disconnected state.

4. The input device according to claim 1, wherein a sensitivity for detection of the change in capacitance of the proximity detector is higher than a sensitivity for detection of the change in capacitance of the contact location detector.

5. The input device according to claim 1, wherein the substrate is transmissive to light.

6. The input device according to claim 1, further comprising:
   an operation controller configured to
      upon detection of the approach of the user by the proximity detector, cause operation of a mount apparatus in a first mode, and
      upon elapsing of a touch detection time for detection of the contact location of the user by the contact location detector during a time period of operation of the mount apparatus in the first mode, cause operation of the mount apparatus in a second mode different from the first mode.

7. An input device for inputting by touch of a user, comprising:
   first electrodes spaced from one another in a first direction and arranged in side-by-side relation on a substrate;
   second electrodes spaced from one another in a second direction and arranged in side-by-side relation on the substrate, the second direction intersecting the first direction;
   a third electrode, when viewed in a direction perpendicular to the substrate,
      that overlaps the first electrodes and the second electrodes, or
      that is separated from the first electrodes and the second electrodes, and formed in a frame shape continuously surrounding a periphery of the first electrodes and the second electrodes;
   a contact location detector configured to detect a contact location of the user in accordance with a change in capacitance of each of the first electrodes and each of the second electrodes; and
   a proximity detector configured to detect approach of the user in accordance with a change in capacitance of the third electrode.

8. The input device according to claim 7, wherein the contact location detector detects the contact location of the user after detection of the approach of the user by the proximity detector and until elapsing of a touch detection time for the contact location detector to detect the contact location of the user.

9. The input device according to claim 8, wherein the proximity detector, until detecting the approach of the user after elapsing of the touch detection time, detects approach of the user.

10. A method for controlling an input device, for inputting by touch of a user, comprising:
    first electrodes spaced from one another in a first direction and arranged in side-by-side relation on a substrate;
    second electrodes spaced from one another in a second direction and arranged in side-by-side relation on the substrate, the second direction intersecting the first direction;
    a third electrode separated from, and disposed at a periphery of, the first electrodes and the second electrodes when viewed in a direction perpendicular to the substrate; and
    a switch configured to switch between an electrically connected state and an electrically disconnected state, at least one first electrode of the first electrodes and the third electrode being mutually electrically connected so that the at least one first electrode and the third electrode are equipotential in the connected state, each of the first electrodes and the third electrode being electrically disconnected in the disconnected state,
    the method comprising:
    detecting, by a contact location detector, a contact location of the user in accordance with a change in capacitance of each of the first electrodes and each of the second electrodes in the disconnected state; and detecting, by a proximity detector, approach of the user in accordance with a change in capacitance of the third electrode in the connected state.

11. A method for controlling an input device, for inputting by touch of a user, comprising:
   first electrodes spaced from one another in a first direction and arranged in side-by-side relation on a substrate;
   second electrodes spaced from one another in a second direction and arranged in side-by-side relation on the substrate, the second direction intersecting the first direction; and
   a third electrode, when viewed in a direction perpendicular to the substrate,
      that overlaps the first electrodes and the second electrodes, or
      that is separated from the first electrodes and the second electrodes, and formed in a frame shape continuously surrounding a periphery of the first electrodes and the second electrodes,
   the method comprising:
   detecting, by a contact location detector, a contact location of the user in accordance with a change in capacitance of each of the first electrodes and each of the second electrodes; and
   detecting, by a proximity detector, approach of the user in accordance with a change in capacitance of the third electrode.

* * * * *